United States Patent
Mizobuchi et al.

(10) Patent No.: US 9,275,440 B2
(45) Date of Patent: Mar. 1, 2016

(54) IMAGE PROCESSING DEVICE AND IMAGE PROCESSING METHOD

(71) Applicant: SHARP KABUSHIKI KAISHA, Osaka-shi, Osaka (JP)

(72) Inventors: Ichiro Mizobuchi, Osaka (JP); Akira Koike, Osaka (JP); Masahiko Takiguchi, Osaka (JP); Yoshinori Kohno, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/400,915

(22) PCT Filed: Apr. 23, 2013

(86) PCT No.: PCT/JP2013/061933
§ 371 (c)(1),
(2) Date: Nov. 13, 2014

(87) PCT Pub. No.: WO2013/172159
PCT Pub. Date: Nov. 21, 2013

(65) Prior Publication Data
US 2015/0125090 A1    May 7, 2015

(30) Foreign Application Priority Data

May 15, 2012  (JP) ................. 2012-111954
May 16, 2012  (JP) ................. 2012-112796
Mar. 22, 2013  (JP) ................. 2013-061039

(51) Int. Cl.
*G06T 5/00*  (2006.01)
*G06T 7/20*  (2006.01)
*G06T 5/20*  (2006.01)
*H04N 5/14*  (2006.01)

(52) U.S. Cl.
CPC . *G06T 5/003* (2013.01); *G06T 5/20* (2013.01); *G06T 7/204* (2013.01); *H04N 5/142* (2013.01); *G06T 2207/20192* (2013.01)

(58) Field of Classification Search
None
See application file for complete search history.

(56) References Cited

U.S. PATENT DOCUMENTS

| | | | |
|---|---|---|---|
| 6,392,759 B1 * | 5/2002 | Kuwata et al. | 358/1.9 |
| 2005/0140829 A1 * | 6/2005 | Uchida et al. | 348/625 |
| 2007/0109447 A1 | 5/2007 | Yamashita et al. | |
| 2010/0033497 A1 * | 2/2010 | Ueno et al. | 345/611 |
| 2010/0266203 A1 * | 10/2010 | Elhassani et al. | 382/168 |
| 2012/0127371 A1 * | 5/2012 | Watanabe et al. | 348/687 |

FOREIGN PATENT DOCUMENTS

| | | |
|---|---|---|
| JP | 5-67210 A | 3/1993 |
| JP | 6-164929 A | 6/1994 |
| JP | 10-320557 A | 12/1998 |

(Continued)

*Primary Examiner* — Vu Le
*Assistant Examiner* — Alexander J Lesnick
(74) *Attorney, Agent, or Firm* — Birch, Stewart, Kolasch & Birch, LLP

(57) ABSTRACT

An image processing device (100) is configured such that an edge histogram creating section (130) calculates interproximal pixel luminance difference for each of pixels constituting a frame, and a first ratio, which is a ratio of pixels whose interproximal pixel luminance difference is greater than or equal to a first threshold, and an edge enhancement section (140) performs edge enhancement in such a way that a shoot component to be added is smaller for a frame having a larger first ratio.

12 Claims, 14 Drawing Sheets

(56) References Cited

FOREIGN PATENT DOCUMENTS

| JP | 2003-123072 | A | 4/2003 |
|----|-------------|---|--------|
| JP | 2005-312008 | A | 11/2005 |
| JP | 2006-217385 | A | 8/2006 |
| JP | 2007-288534 | A | 11/2007 |
| JP | 2009-100270 | A | 5/2009 |
| JP | 2009-290608 | A | 12/2009 |
| JP | 4550016 | B2 | 9/2010 |

\* cited by examiner

| 1ST RATIO (X) | X < 30% | 30% ≤ X < 70% | 70% ≤ X ≤ 100% |
|---|---|---|---|
| EDGE ENHANCEMENT FILTER | STRONG ENHANCEMENT (1ST EDGE ENHANCEMENT FILTER) | INTERMEDIATE ENHANCEMENT (2ND EDGE ENHANCEMENT FILTER) | WEAK ENHANCEMENT (3RD EDGE ENHANCEMENT FILTER) |

FIG. 6

| 1ST RATIO (X) | X < 30% | 30% ≤ X < 70% | 70% ≤ X ≤ 100% |
|---|---|---|---|
| 1ST FILTER SELECTING TABLE → EDGE ENHANCEMENT FILTER (2ND RATIO ≥ 3RD RATIO) | STRONG ENHANCEMENT (1ST EDGE ENHANCEMENT FILTER) | INTERMEDIATE ENHANCEMENT (2ND EDGE ENHANCEMENT FILTER) | WEAK ENHANCEMENT (3RD EDGE ENHANCEMENT FILTER) |
| 2ND FILTER SELECTING TABLE → EDGE ENHANCEMENT FILTER (2ND RATIO < 3RD RATIO) | INTERMEDIATE ENHANCEMENT (2ND EDGE ENHANCEMENT FILTER) | WEAK ENHANCEMENT (3RD EDGE ENHANCEMENT FILTER) | NO ENHANCEMENT (NO FILTER USED) |

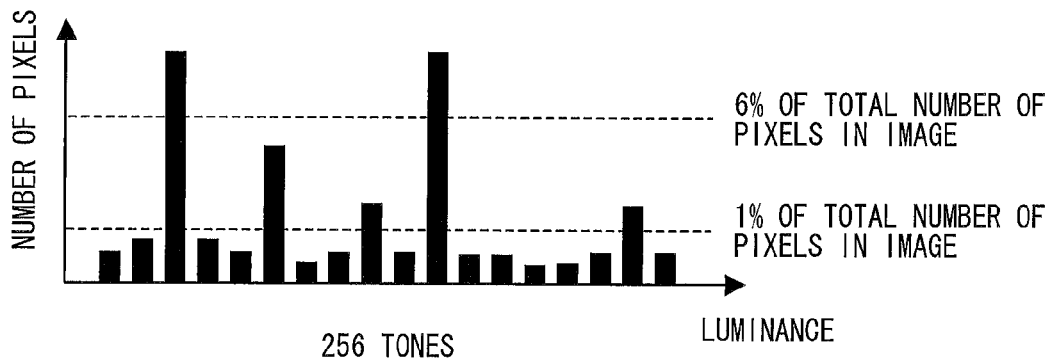

IMAGE PROCESSING DEVICE AND IMAGE PROCESSING METHOD

TECHNICAL FIELD

The present invention relates to an image processing device and an image processing method, each of which improves a quality of an image.

BACKGROUND ART

Conventionally, a technique for improving sharpness of an image by performing edge enhancement has been known as a technique for improving a quality of an image. Edge enhancement clarifies details of the image, thereby making it possible to display the image sterically.

CITATION LIST

Patent Literatures

Patent Literature 1

Japanese Patent Publication, No. 4550016 (Issue Date: Sep. 22, 2010)

Patent Literature 2

Japanese Patent Application Publication, Tokukai, No. 2009-100270 (Publication Date: May 7, 2009)

SUMMARY OF INVENTION

Technical Problem

However, depending on a content of images, white bordering may be given to contours in the images by applying the edge enhancement, thereby making the images unnaturally glittering. That is, depending on the content of an image, glittering, which is an adverse effect of the edge enhancement, would be caused in the image.

Patent Literature 1 describes an art in which contrast is lowered in a portion having even luminance and contrast is enhanced in a portion having uneven luminance, with the use of an edge density which is density of edge pixels. Moreover, Patent Literature 1 also describes that, when an edge density is calculated, edge strengths of pixels greater or equal to a certain level are assumed to be 0 (zero), whereby portions whose contrast is to be enhanced are portions other than very dark portions and very bright portions, thereby preventing reduction in contracts in the very dark portions or very bright portions. As such, the art described in Patent Literature 1 notes importance of edge pixels but aims to perform appropriate contrast enhancement. That is, the art described in Patent Literature 1 is not for preventing the aforementioned adverse effect caused by the edge enhancement.

The present invention was made in view of the problem, and an object of the present invention is to realize an image processing device capable of subduing glittering, which is an adverse effect caused by the edge enhancement.

Solution to Problem

In order to attain the object, an image processing device according to one aspect of the present invention is an image processing device including an edge enhancement section configured to perform edge enhancement by adding a shoot component in a frame constituting an image, the image processing device including: a calculating section configured to calculate, for each of pixels constituting the frame, a luminance difference between a pixel and another pixel adjacent to the pixel, and to calculate a first ratio which is a ratio of pixels whose luminance difference is greater than or equal to a first threshold, the edge enhancement section performing the edge enhancement in such a way that the shoot component to be added is smaller for a frame having a larger first ratio.

Moreover, an image processing method according to one aspect of the present invention is an image processing method for performing edge enhancement by adding a shoot component in a frame constituting an image, the method including the steps of: calculating, for each of pixels constituting the frame, a luminance difference between a pixel and another pixel adjacent to the pixel, and calculating a first ratio which is a ratio of pixels whose luminance difference is greater than or equal to a first threshold; and performing the edge enhancement in such a way that the shoot component to be added is smaller for a frame having a larger first ratio.

Advantageous Effects of Invention

The present invention makes it possible to subdue glittering, which is an adverse effect caused by the edge enhancement.

BRIEF DESCRIPTION OF DRAWINGS

FIG. 6 is a view illustrating another example of the filter selecting table.

FIG. 15 is a view illustrating one example of luminance histogram detected in an image by the image processing device according to Embodiment 8 of the present invention.

FIG. 16 is a view illustrating one example of inter-frame difference histogram detected in an image by the image processing device according to Embodiment 8 of the present invention.

FIG. 17 is a view illustrating one example of an edge histogram detected in an image by the image processing device according to Embodiment 8 of the present invention.

DESCRIPTION OF EMBODIMENTS

Embodiment 1

Television Receiver 1

Figure 1:
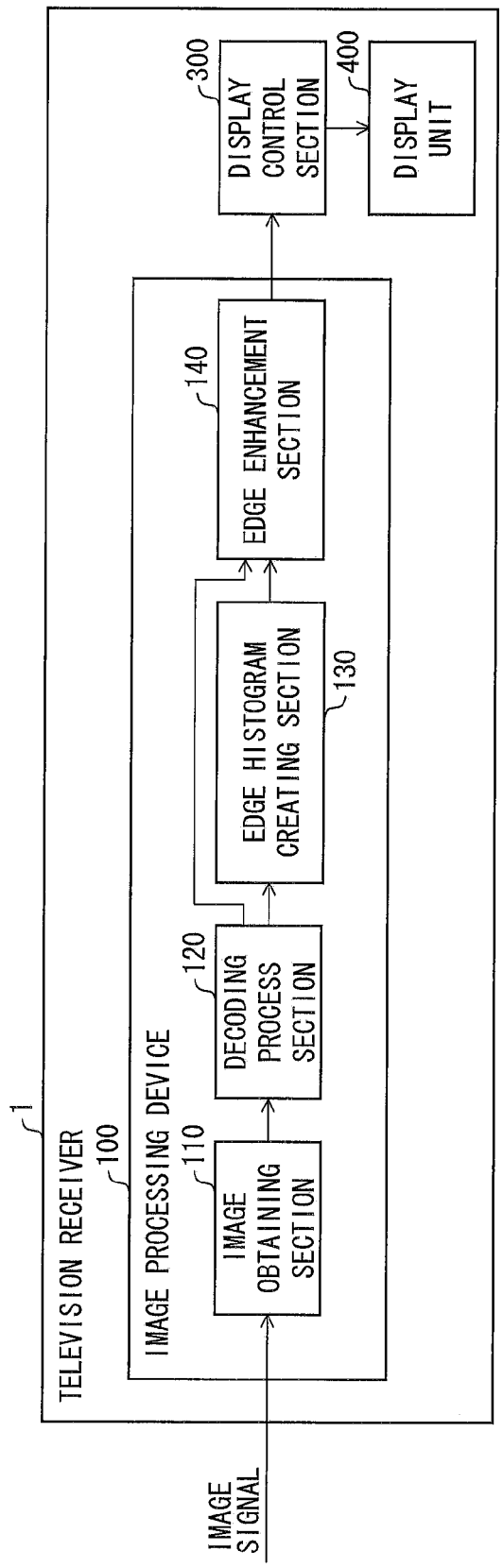
FIG. 1 is a functional block diagram illustrating a configuration of a television receiver according to Embodiment 1 of the present invention.

FIG. 1 is a functional block diagram of a television receiver 1 according to Embodiment 1 of the present invention. The television receiver 1 includes an image processing device 100 for performing quality improvement of an image inputted, a display section 300 such as a liquid crystal display device, a plasma display device, an organic EL display device, or the like, and a display control section 400 for causing the display section 300 to display frames sequentially outputted from the image processing device 100, thereby causing the display section 300 to display an image consisting of the frames.

(Image Processing Device 100)

The image processing device 100 is configured to perform quality improvement of an image signal inputted thereto, and output a plurality of frames constituting the image. The frames are constituted by image data indicating color density values of colors of a predetermined number of pixels. The image processing device 100 includes an image obtaining section 110, a decoding process section 120, an edge histogram creating section (calculating section) 130, and an edge enhancement section 140.

(Image Obtaining Section 110)

The image obtaining section 110 is configured to receive an image signal, which is a signal representing the image. The image signal may be obtained from various sources of image signals such as broadcast waves, image data stored in a recording medium, etc. Moreover, the image obtaining section 110 also obtains a quantization parameter necessary for decoding the image signal. For example, the quantization parameter is described in a header portion of an image stream. In this case, the image obtaining section 110 obtains the quantization parameter together with the image stream.

(Decoding Process Section 120)

The decoding process section 120 is configured to decode the image signal obtained by the image obtaining section 110. In general, the image signal is encoded somehow. Therefore, the process of the decoding section 120 is necessary.

The image signal to be decoded by the decoding process section 120 is encoded, for example, according to MPEG-1, MPEG-2, H.264/MPEG-4.AVC, etc.

The decoding process section 120, for example, creates a decoded image by preparing a prediction image by in-screen prediction (intra prediction) or inter-screen prediction (inter prediction), and adding respective pixel values decoded from the image signal to pixel values of the prediction image.

In a case where the prediction image is prepared by the inter prediction, the decoding section 120 performs the creation of the prediction image by referring to one or more previously-decoded images, which have been previously decoded and stored in a frame memory (not illustrated), and performing motion compensation of blocks constituting the previously-decoded image(s). The motion compensation is performed by using motion vectors, and motions vector information representing the motion vectors is decoded from the image signal.

Moreover, in general, the image signal contains quantization conversion coefficients (which may be simply called conversion coefficients) obtained by subjecting pixel values of pixels in each of blocks to frequency conversion (for example, DCT (Discrete Cosine Transform) conversion), and then subjecting the frequency-converted pixel values to the quantization process in accordance with the quantization parameters. For example, when the image signal is one encoded per block consisting of 8×8 pixels, the image signal contains quantization coefficients of respective 8×8 constituents for each block.

In order to decode the image signal, the decoding process section 120 decodes the pixel values by performing inverse quantization of the conversion coefficients according to the quantization parameters and then performing inverse frequency conversion.

Moreover, the frames (pictures) in the image signal are largely classified as follows.

I Picture: a picture decodable without referring to the other picture. The I picture is a frame encoded by the intra prediction, for example.

P picture: a picture decodable by referring to another picture. The P picture is a frame encoded by the inter prediction, for example.

B picture: a picture decodable by referring to two other pictures. The B picture is a frame encoded by the inter prediction.

In this way, the decoding process section 120 outputs frame data of each frame constituting an image.

(Edge Histogram Creating Section 130)

Figure 2:
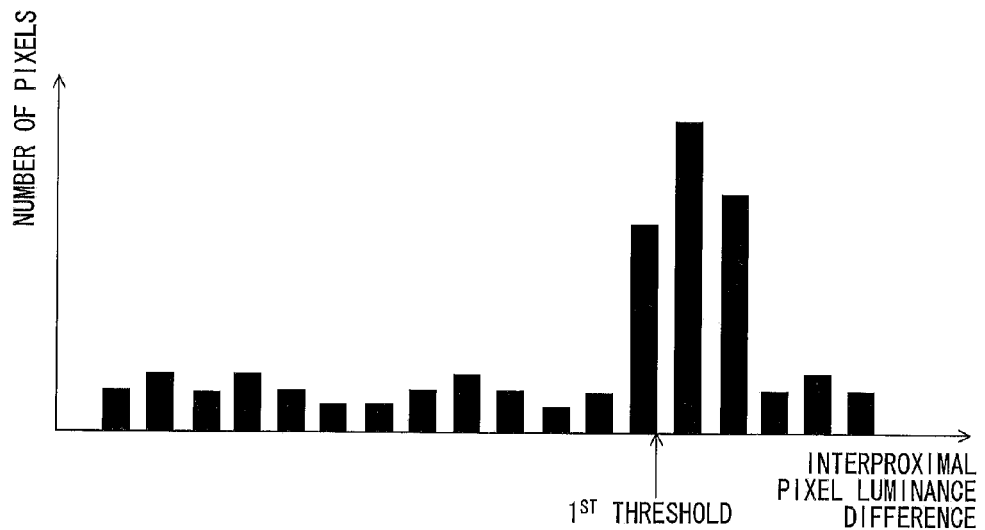
FIG. 2 is a view illustrating one example of edge histogram.

For each frame outputted from the decoding process section 120, the edge histogram creating section 130 (i) calculates, for each of pixels constituting the frame, an interproximal pixel luminance difference which is an absolute value of luminance difference between the pixel and another pixel adjacent to the pixel, and (ii) creates the edge histogram indicating the number of pixels with respect to each of the interproximal pixel luminance differences. FIG. 2 is a view illustrating one example of an edge histogram created by the edge histogram creating section 130.

Moreover, the edge histogram creating section 130 finds out a first ratio from the edge histogram thus created, the first ratio being a ratio of the number of pixels, which have the interproximal pixel luminance difference greater than or equal to a predetermined first threshold, with respect to the number of the pixels in total. The edge histogram creating section 130 supplies the first ratio to the edge enhancement section 140.

In the present embodiment, the interproximal pixel luminance differences calculated by the edge histogram creating section 130 are an absolute value of luminance difference between a target pixel and a pixel rightward next to the target pixel. In this way, the edge histogram creating section 130 attains a faster processing speed. Moreover, this makes it easier to detect a luminance difference associated with an edge in a screen vertical direction, which edge causes glittering easily noticeable for a user watching the image.

It should be noted that the calculation of the interproximal pixel luminance difference by the edge histogram creating section 130 is not limited to the above described one. For example, the edge histogram creating section 130 may calculate, as the interproximal pixel luminance difference, an absolute value of a luminance difference between a target pixel and a pixel which is leftward, upward, or downward next to the target pixel. As an alternative, the edge histogram creating section 130 may calculate, as the interproximal pixel luminance difference, a representing value (e.g., an average, a maximal value, or the like) of absolute values of luminance differences between a target pixel and 4 pixels or 8 pixels around the target pixel. The 4 pixels are rightward, leftward, upward, and downward next to the target pixel. The 8 pixels are rightward, leftward, upward, downward, and diagonally next to the target pixel.

(Edge Enhancement Section 140)

The edge enhancement section 140 is configured to perform the edge enhancement by adding a shoot component to edge portions (contour portions) with respect to a whole of each frame outputted from the decoding process section 120, the shooting component being an overshoot and/or undershoot. More specifically, the edge enhancement section 140 performs the edge enhancement by applying an edge enhancement filter to the frame. The edge enhancement filter removes, from the frame data, a component calculated from secondary differentiation of the frame data.

Here, the edge enhancement section 140 performs the edge enhancement with a smaller shoot component (i.e. a smaller extent of the edge enhancement) for a frame with a larger first ratio calculated by the edge histogram creating section 130. That is, a shoot component for a frame with relatively large first ratio is small, while a shoot component for a frame with a relatively small first ratio is large.

What is meant by a large first ratio of the number of pixels having interproximal pixel luminance differences greater than or equal to the first threshold in with respect to the number of pixels in total is that the frame contains a large number of edges having relatively large luminance differences with respect to adjacent pixels. When the edge enhancement is carried out for an edge having a relatively large luminance difference with respect to an adjacent pixel, the shoot component added is large, thereby possibly causing glittering by providing white bordering to the edge portion.

However, the edge enhancement section 140 according to the present embodiment performs the edge enhancement in such a way that a smaller shoot component is used for a frame having a larger first ratio. With this configuration, it is possible to prevent glittering of the edge having a relatively large luminance difference with respect to an adjacent pixel.

In the following, two concrete examples of the process performed by the edge enhancement section 140 are explained. It should be noted that the present invention is not limited to the concrete examples, as long as the process reduces the shoot component to be smaller when the first ratio is larger, the first ratio being the ratio of the number of pixels, which have interproximal pixel luminance differences of greater than or equal to the predetermined first threshold, with respect to the number of pixels in total.

Concrete Example 1

Figure 3:
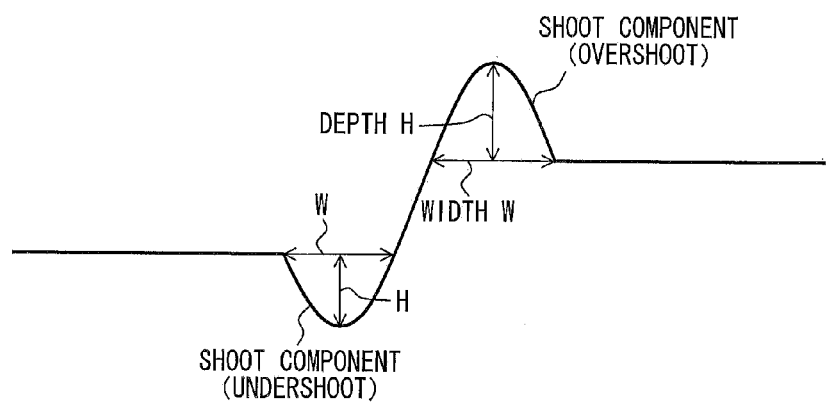
FIG. 3 is a view illustrating a shoot component to be added to an edge portion by edge enhancement.

The edge enhancement section 140 stores in advance a plurality of edge enhancement filters for different degrees of shoot component to be added to edge portions in the edge enhancement. FIG. 3 is a view illustrating a shoot component to be added in edge portions by the edge enhancement. As illustrated in FIG. 3, when a shoot component obtained by secondary differentiation is added to an edge, overshoot is caused at an upper end of the edge and undershoot is caused at a lower edge of the edge. In this regard, the edge enhancement section 140 stores in advance a plurality of edge enhancement filters for shoot components having respective different heights H and respective different widths W. In this example, the edge enhancement section 140 stores (1) a first edge enhancement filter for providing a shoot component unadjusted from a component prepared by the secondary differentiation, (2) a second edge enhancement filter for providing a shoot component adjusted to be smaller in depth H and width W than the first edge enhancement filter, and (3) a third edge enhancement filter for providing a shoot component adjusted to be smaller in depth H and width W than the second edge enhancement filter. That is, the first edge enhancement filter is a filter for a relatively large extent of edge enhancement (in particular, a filter for no reduction in shoot component). The second edge enhancement filter is a filter for intermediate extent of edge enhancement (in particular, a filter for intermediate reduction in shoot component). The third edge enhancement filter is a filter for a relatively small extent of edge enhancement (in particular, a filter for large reduction in shoot component). The degree of the shoot component can be controlled by adjusting a filter coefficient, filter size, or the like of the edge enhancement filter.

Figures 4, 5:
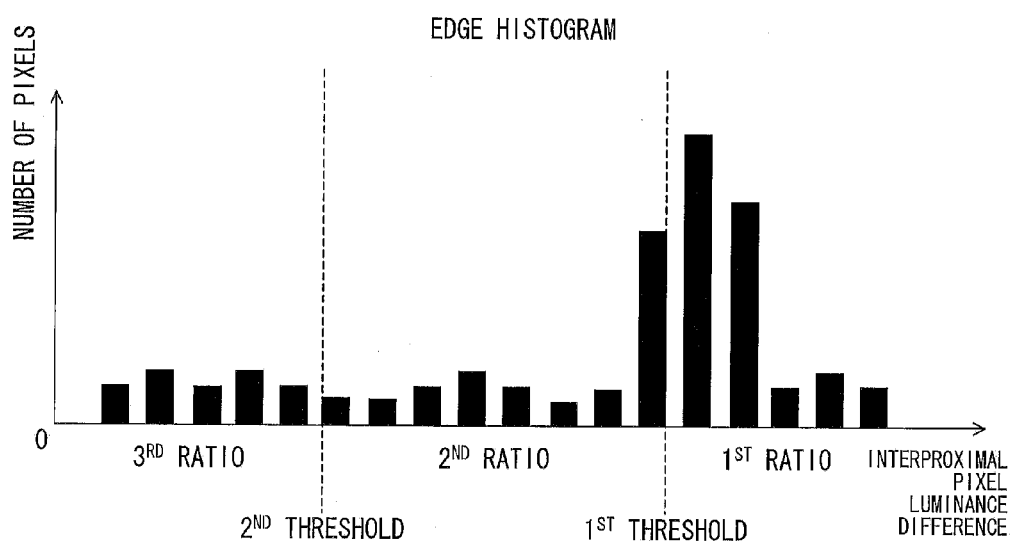
FIG. 4 is a view illustrating one example of a filter selecting table.
FIG. 5 is a view illustrating relationship between an edge histogram and first to third ratios.

The edge enhancement section 140 stores a filter selecting table (correspondence information) in which three (3) fractional ranges into which a possible range of the first ratio is fractioned are associated with the edge enhancement filters suitable for the fractional ranges. FIG. 4 is a view illustrating one example of the filter selecting table. In FIG. 4, three (3) fractional ranges, namely "less than 30%", "30% to less than 70%" and "70% to 100%" are contained. As illustrated in FIG. 4, a larger first ratio is associated with an edge enhancement filter for a smaller shoot component (extent of the edge enhancement). Then, for each frame, the edge enhancement section 140 refers to the filter selecting table to determine an edge enhancement filter associated with the first ratio calculated for the frame, and performs the edge enhancement with the edge enhancement filter thus determined.

In this concrete example, the edge enhancement for a frame with a larger first ratio is carried out with an edge enhancement filter for a smaller shoot component. That is, for a frame having a greater number of edges having large luminance differences with adjacent pixels, an edge enhancement filter for a smaller shoot component is applied. This reduces degrees of the overshoot and undershoot in the edge enhancement, thereby making it possible to prevent glittering of an edge having a large luminance difference with an adjacent pixel.

In this concrete example, the edge enhancement section 140 stores in advance three types of edge enhancement filters and performs the edge enhancement with any one of shoot components of three levels. However, the number of the types of the edge enhancement filters stored by the edge enhancement section 140 is not limited to 3, and may be 2 or 4 or more. Regardless of how many types of edge enhancement filters are stored by the edge enhancement section 140, the glittering, which is an adverse effect of the edge enhancement, can be prevented by selecting edge enhancement filters in such a way that an edge enhancement filter for providing a smaller shoot component is selected for a frame with a larger first ratio.

Concrete Example 2

There are various types of images, including images, a significant fraction of which is a single-color monotone region(s) such as CG images. In such an image having a significant fraction that is a single-color monotone region(s), it is not so required to increase the extent of the edge enhancement. If a shoot component is added to a single-color monotone region unnecessarily, the addition of the shoot component would turn into a noise, thereby deteriorating image quality. This concrete example is one in which the degree of the shoot component varies depending on whether or not an image has a significant fraction that is a single-color monotone region(s).

In this concrete example, as in Concrete Example 1, the edge enhancement section 140 stores the first to third edge enhancement filters.

In this concrete example, as illustrated in FIG. 5, the edge histogram creating section 130 calculates a second ratio and a third ratio in addition to the first ratio, on the basis of the edge histogram. The second ratio is a ratio of the number of pixels, which have interproximal pixel luminance differences less than the first threshold but greater than or equal to a second threshold (<the first threshold), with respect to the number of pixels in total. The third ratio is a ratio of the number of pixels, which have interproximal pixel luminance differences less than the second threshold, with respect to the number of pixels in total. The edge histogram creating section 130 outputs the first to third ratios to the edge enhancement section 140.

Further, the edge enhancement section 140 stores filter selecting tables in each of which a range of the first ratio is associated with an edge enhancement filter suitable for the range. Note that the edge enhancement section 140 stores filter selecting tables which vary depending on whether or not "second ratio third ratio" is satisfied. FIG. 6 is a view illustrating an example of the filter selecting tables of Concrete Example 2. As illustrated in FIG. 6, the edge enhancement section 140 stores (i) a first filter selecting table which corresponds to a case where "second ratio≥third ratio" is satisfied and (ii) a second filter selecting table which corresponds to a case where "second ratio<third ratio" is satisfied. Note that, in the second filter selecting table, no filter is set for the first ratio of 70% to 100%. This means that no edge enhancement is carried out and the shoot component is 0. In each of the first filter selecting table and the second filter selecting table, a larger first ratio is associated with an edge enhancement filter for a smaller shoot component. Note that a shoot component (i.e., extent of the edge enhancement) of an edge enhancement filter associated with a certain first ratio in the first filter selecting table is set to be larger than that associated with the certain first ratio in the second filter selecting table.

The edge enhancement section 140 compares the second ratio and the third ratio calculated for each frame. If the second ratio≥the third ratio, the edge enhancement section 140 determine to use the first filter selecting table. If the second ratio<the third ratio, the edge enhancement section 140 determine to use the second filter selecting table. After that, the edge enhancement section 140 refers to the filter selecting table thus determined, so as to find out an edge enhancement filter corresponding to the first ratio. Then, the edge enhancement section 140 performs the edge enhancement with the edge enhancement filter thus found out.

In an image, a significant fraction of which is a single-color monotone region(s), the number of pixels having relatively small interproximal pixel luminance differences is large. Therefore, an image satisfying the second ratio<the third ratio has a higher probability that the single-color monotone region is large. In the concrete example, if the second ratio<the third ratio, the second filter selecting table is determined to use, whose shoot component is relatively small. This makes it possible to avoid performing unnecessary extensive edge enhancement for an image having a significant fraction that is a single-color monotone region(s), thereby preventing image quality deterioration.

Moreover, in either the first filter selecting table and the second filter selecting table, larger first ratios are associated with edge enhancement filters with smaller shoot components. Therefore, for a frame having a large number of edges having a large luminance differences with respect to adjacent pixels, an edge enhancement filter for providing a relatively small shoot component is applied. This makes it possible to prevent glittering at an edge having a large luminance difference with respect to an adjacent pixel.

Summary of Embodiment 1

The image processing device 100 according to the present embodiment includes an edge enhancement section 140 configured to perform edge enhancement by adding a shoot component in a frame constituting an image; and an edge histogram creating section (calculating section) 130 configured to calculate, for each of pixels constituting the frame, an interproximal pixel luminance difference, and to calculate a first ratio which is a ratio of pixels whose interproximal pixel luminance difference is greater than or equal to a first threshold. The edge enhancement section 140 performs the edge enhancement in such a way that the shoot component to be added is smaller for a frame having a larger first ratio. The first threshold is set to such a value of the interproximal pixel luminance difference that white bordering causing glittering appears when an excess shoot component is added. With this configuration, white bordering caused by a shoot component can be prevented in a frame having an edge at which luminance differences between adjacent pixels are large. As a result, it is possible to reduce glittering (e.g., glittering at strips of a vertical-striped suit) which is adversely caused by edge enhancement.

Embodiment 2

Figure 8:
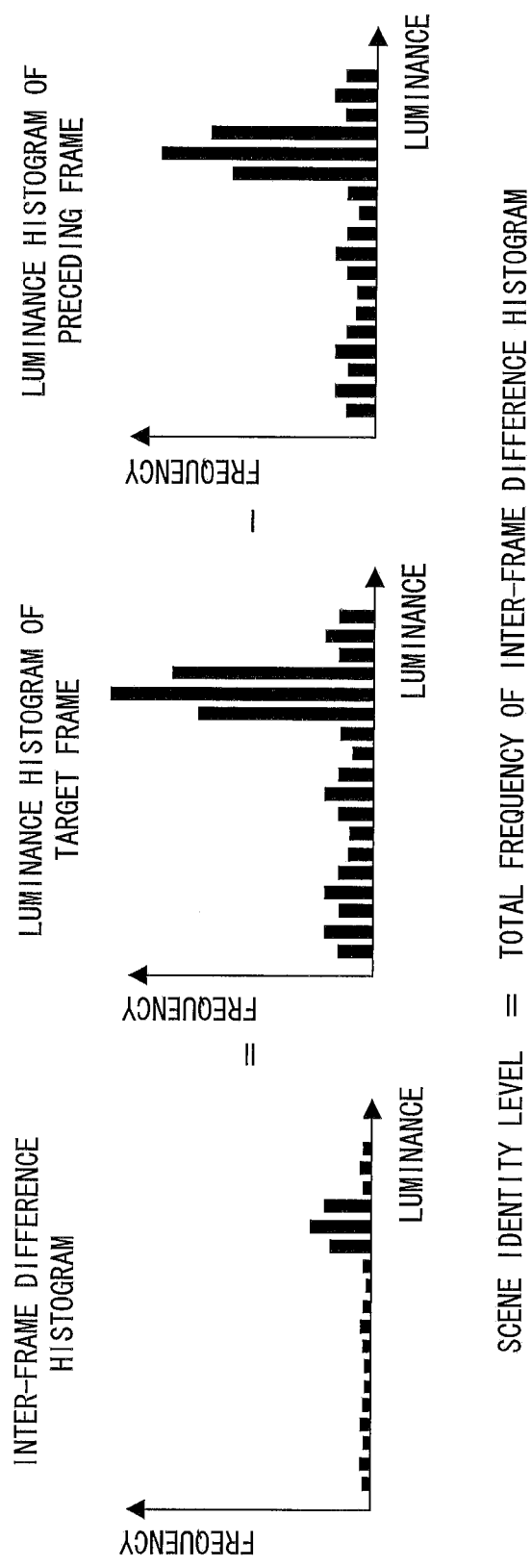
FIG. 8 is a view illustrating a calculation example of an inter-frame difference histogram.
Figure 9:
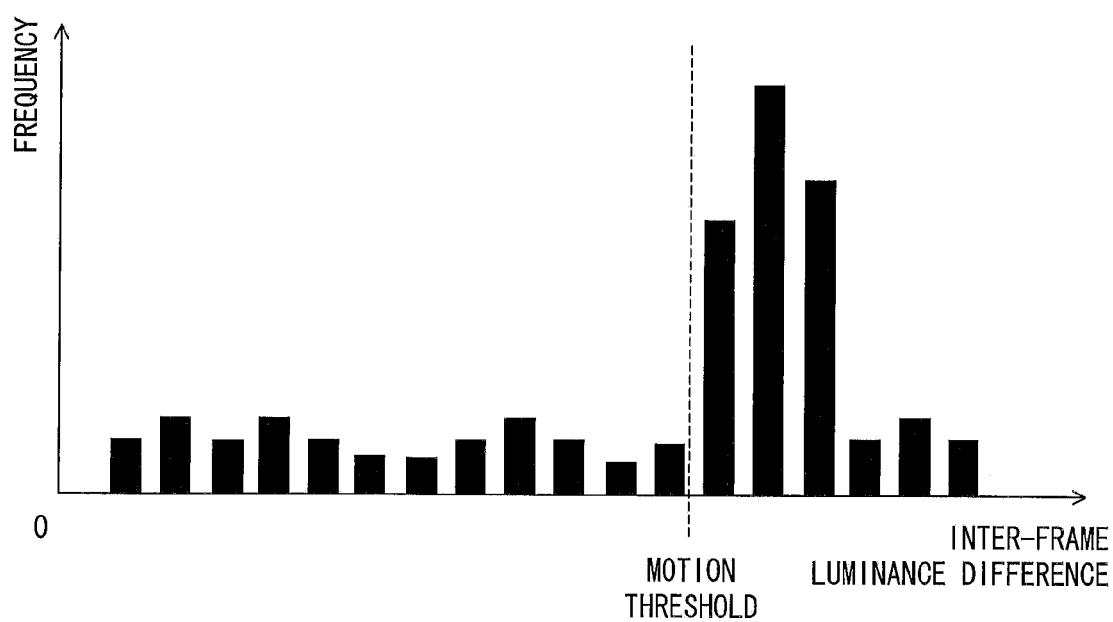
FIG. 9 is a view illustrating one example of a luminance difference histogram.

Another embodiment according to the present invention is described below with reference to FIGS. 7 through 9. For the sake of easy explanation, members having the same functions as those explained with reference to the drawings in Embodiment 1 are given the same reference signs.

Regarding glittering caused due to edge enhancement with a large shoot component to an edge having a large interproximal pixel luminance difference, such glittering often become more noticeable when a scene with a large number of edges having large interproximal pixel luminance differences is scroll-displayed. For example, an image showing a person (e.g. a newscaster) wearing a vertical-striped suit is scroll-displayed. The present embodiment is an embodiment for providing a small shoot component only when such glittering would become noticeable.

(Image Processing Device 101)

Figure 7:
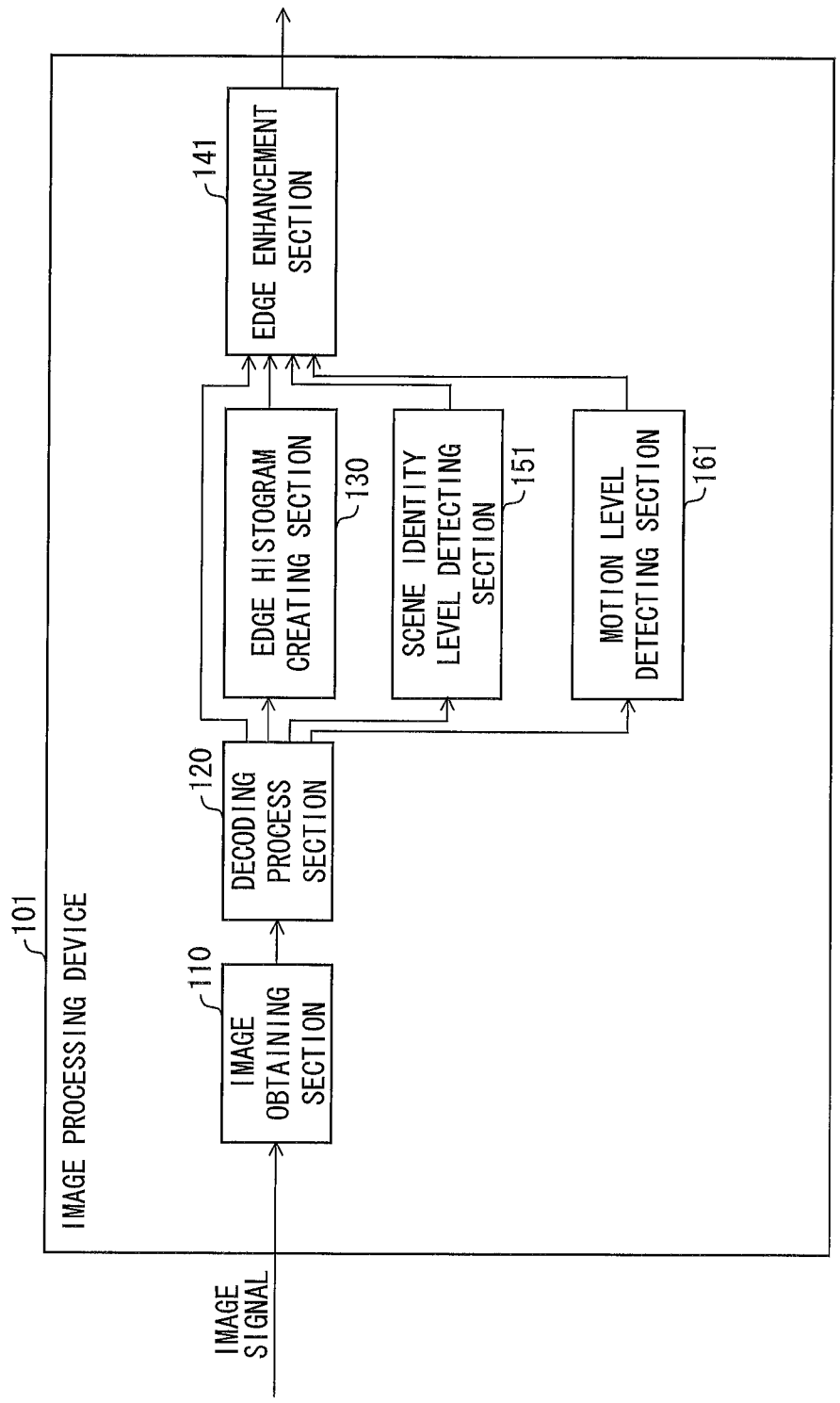
FIG. 7 is a functional block diagram illustrating a configuration of an image processing device according to Embodiment 2.

FIG. 7 is a block diagram illustrating a configuration of an image processing device 101 according to the present embodiment. As illustrated in FIG. 7, the image processing device 101 is different from the image processing device 100 in Embodiment 1 (see FIG. 1) in that the image processing device 101 includes an edge enhancement section 141 instead of the edge enhancement section 140, and a scene identity level detecting section 151 and a motion level detection section 161 in addition.

(Scene Identity Level Detecting Section 151)

The scene identity level detecting section 151 is configured to detect a scene identity level, which is a magnitude indicating how identical a target frame is with a frame preceding the target frame. The scene identity level detecting section 151 outputs the scene identity level thus detected, to the edge enhancement section 141.

More specifically, the scene identity level detecting section 151 prepares a luminance histogram for each frame, the luminance histogram indicating the number of pixels with respect to each of the luminance values among all pixels in the frame. The scene identity level detecting section prepares an inter-frame difference histogram, which is a histogram indicating differences between a luminance histogram of a target frame and a luminance histogram of a frame preceding the target frame. FIG. 8 is a view illustrating one example of an inter-frame difference histogram thus prepared by the scene identity level detecting section 151. The scene identity level detecting section 151 calculates a total frequency of the inter-frame difference histogram as the scene identity level.

(Motion Level Detecting Section 161)

The motion level detecting section 161 is configured to detect a motion level, which is a parameter indicating a motion on an image between a target frame and a frame preceding the target frame. The motion level detecting section 161 outputs the motion level thus detected, to the edge enhancement section 141.

More specifically, the motion level detecting section 161 calculates an inter-frame luminance difference for each pixel, the inter-frame luminance difference being an absolute value of luminance difference in the pixel between the target frame and the frame preceding the target frame. Then, the motion level detecting section 161 prepares a luminance difference histogram indicating the number of pixels with respect to each of the inter-frame luminance differences. FIG. 9 is a view illustrating one example of the luminance difference histogram prepared by the motion level detecting section 161. The motion level detecting section 161 calculates, as the motion level, a ratio (sum of frequencies greater than or equal to a motion threshold/sum of all of the frequencies) of frequencies greater than or equal to a predetermined motion threshold in the luminance difference histogram. The motion threshold is a preset value.

(Edge Enhancement Section 141)

Similarly to the edge enhancement section 140, the edge enhancement section 141 performs edge enhancement (contour enhancement) for each frame by adding a shoot component to an edge portion in the frame, the shoot component being overshoot and/or undershoot. Moreover, similarly to the edge enhancement section 140, the edge enhancement section 141 calculates a first ratio of the number of pixels, which have interproximal pixel luminance differences greater than or equal to a predetermined first threshold, with respect to the number of pixels in total, and a degree of a shoot component is changed depending on the first ratio. However, in the present embodiment, the adjustment in the degree of the shoot component according to the first ratio is performed only when the following conditions A and B are both satisfied.

Condition A: Scene identity level<Scene identity level Criterion Threshold

Condition B: Motion level>Motion Scene Criterion Threshold

The scene identity criterion threshold is a preset value (predetermined value) (i) with which it is easy to distinguish whether or not scenes are identical with each other and (ii) which is experimentally obtained based on various images. The scene identity level is a parameter that is smaller as a degree of identity is higher between a scene in a target frame and a scene in a frame preceding the target frame. Thus, by checking whether the condition A is satisfied, it is possible to detect a target frame being highly possibly identical with a frame preceding the target frame.

Moreover, the motion scene criterion threshold is a preset amount (predetermined amount) which (i) is experimentally obtained based on various images and (ii) is a value of motion level at which glittering at an edge becomes noticeable when a large shoot component is added. The motion level is a parameter, which increases in proportion with how large the motion of an object on an image is between a target frame and a frame preceding the target frame. Thus, by checking whether the condition B is satisfied, it is possible to detect a target frame being highly possibly a frame in which an object on an image moves between the target frame and a frame preceding the target frame.

As described above, an image in which glittering caused by the edge enhancement to an edge having a large interproximal pixel luminance difference is noticeable is an image in which an identical scene is scroll-displayed. In regard to this, the edge enhancement section 141 is configured to extract a frame satisfying both the conditions A and B, so as to identify a frame having glittering.

The following explains concrete examples in which the degree of the shoot component is changed in the edge enhancement section 141.

Concrete Example 3

The edge enhancement section 141 stores in advance two types of edge enhancement filters for shoot components different in depths H and widths W, as illustrated in FIG. 3. In this example, the edge enhancement section 141 stores a first edge enhancement filter for providing a shoot component unadjusted from a component prepared by the secondary differentiation, and (2) an Nth edge enhancement filter for providing a shoot component adjusted to be smaller in depth H and width W than the first edge enhancement filter.

The edge enhancement section 141 carries out the edge enhancement with the first edge enhancement filter when at least one of the conditions A and B is not satisfied. When at least one of the conditions A and B is not satisfied, the glittering, which is an adverse effect of the edge enhancement, is not noticeable, and the image quality will not be deteriorated even if the first edge enhancement filter for not reducing the shoot component is used.

On the other hand, when both of the conditions A and B are satisfied, the edge enhancement section 141 judges whether or not the first ratio satisfies the following condition C.

Condition C: First Ratio>Large Edge Scene Criterion Threshold

Here, the large edge scene criterion threshold is preset, and is, for example, 70% similarly to the fractional range "70% to 100%" as illustrated in FIG. 4 explained in Embodiment 1. The first ratio is, as explained in Embodiment 1, a parameter, which increase for a frame having a larger number of pixels having large interproximal pixel luminance differences, that is, for a frame having a greater fraction that is a clear edge portion(s). Thus, by checking whether the condition C is satisfied, it is possible to detect a frame being highly possibly a frame having a large number of pixels having large interproximal pixel luminance differences.

When the condition C is satisfied, the edge enhancement section 141 performs the edge enhancement with the Nth edge enhancement filter. When the condition C is not satisfied, the edge enhancement section 141 performs the edge enhancement with the first edge enhancement filter.

In this way, the Nth edge enhancement filter is used for edge enhancement with smaller shoot component when the conditions A to C are satisfied, that is, only when glittering would be noticeable when the edge enhancement with a large shoot component is carried out. As a result, the glittering can be prevented even in a case of an edge having a large interproximal pixel luminance difference.

Concrete Example 4

In a case of Concrete Example 3, the edge enhancement section 141 changes the filter to be used in the edge enhancement from the first edge enhancement filter to the Nth edge enhancement filter at a timing at which the conditions A to C are satisfied. Here, if a difference between the shoot component provided by the first edge enhancement filter and the shoot component provided by the Nth enhancing filter was large, the change in extent of the edge enhancement would be noticeable. In view of this, Concrete Example 4 is configured to change the extent of the edge enhancement so gradually that the change will not be noticeable.

The edge enhancement section 141 stores in advance second to (N−1)th edge enhancement filters in addition to the first edge enhancement filter and the Nth edge enhancement filter, where the second to N(−1)th edge enhancement filters are set such that a shoot component provided by a kth edge enhancement filter (k=2 to N) is smaller than a shoot component provided by a (k−1)th edge enhancement filter in terms of depth H and width W of the shoot components. That is, the edge enhancement section 141 stores an N number of edge enhancement filters for providing shoot components of N levels, which decrease in sequence. Note that the number of N levels is not particularly limited.

To a frame satisfying the conditions A to C, the edge enhancement section 144 applies an edge enhancement filter whose shoot component is smaller by one level than an edge enhancement filter applied to a frame preceding the frame satisfying the conditions A to C. However, if the filter applied to the frame preceding the frame satisfying the conditions A to C is the Nth edge enhancement filter, the edge enhancement section 144 applies the Nth edge enhancement filter to the frame satisfying the conditions A to C. In this way, if frames satisfying the conditions A to C are sequential frames, the first to Nth edge enhancement filters are applied sequentially, thereby making it possible to change the extent of the edge enhancement in such a way that the extent of the edge enhancement is reduced gradually. This makes the change unnoticeable.

Other Concrete Example

The edge enhancement section 141 may be configured such that the edge enhancement section 141 performs the process described in concrete example 1 or 2 of Embodiment 1 only when the conditions A and B are satisfied.

Summary of Embodiment 2

The image processing device 101 according to the present embodiment includes: a scene identity level detecting section 151 configured to detect a scene identity level indicating how much a target frame and a frame preceding to the target frame are identical with each other; and a motion level detecting section 161 configured to detect a motion level between the target frame and the frame preceding the target frame. In a case where the scene identity level thus detected by the scene identity level detecting section 151 is higher than a predetermined level, and the motion level thus detected by the motion level detecting section 161 is higher than a predetermined level, the edge enhancement section 141 performs the edge enhancement in such a way that the shoot component to be added is smaller for a frame having a larger first ratio. With this configuration, the edge enhancement with a shoot component thus adjusted is carried out only for a frame having a possibility that glittering becomes more noticeable. That is, the process for changing the shoot component can be reduced to minimum necessity.

Embodiment 3

In Embodiments 1 and 2, the edge enhancement sections 140 and 141 prevent the glittering by applying an edge enhancement filter for providing a smaller shoot component for a frame having a large first ratio of pixels having a luminance difference greater than the first threshold in comparison with a pixel adjacent to the pixel. However, the use of a smaller shoot component would possibly cause blurring of the image. In view of this, in a case where an edge enhancement filter for providing a smaller shoot component is applied, the edge enhancement sections 140 and 141 may be configured to perform LTI (Luminance Transition Improvement) process based on a reduced amount of the shoot component. The LTI process is a process to perform edge enhancement by causing a decline of an edge to be steep without adding a shoot component to the edge. Moreover, the LTI process may be configured such that strength of the LTI process, that is, the steepness in decline of the edge is greater for an edge enhancement filter for providing a smaller shoot component.

For example, in a case of Concrete Example 1 of Embodiment 1, when an edge enhancement section 140 of the present embodiment performs the edge enhancement with the third edge enhancement filter, the edge enhancement section 140 also performs the LTI process. As an alternative, when the edge enhancement section 140 of the present embodiment performs the edge enhancement with the second and third edge enhancement filters, the edge enhancement section 140 also performs the LTI process. In this case, the strength of the LTI process is greater when performing the edge enhancement with the third edge enhancement filter than when performing the edge enhancement with the second edge enhancement filter.

This configuration makes it possible to prevent blurring of an image, which blurring is caused by the use of a smaller shoot component.

Embodiment 4

Figure 10:
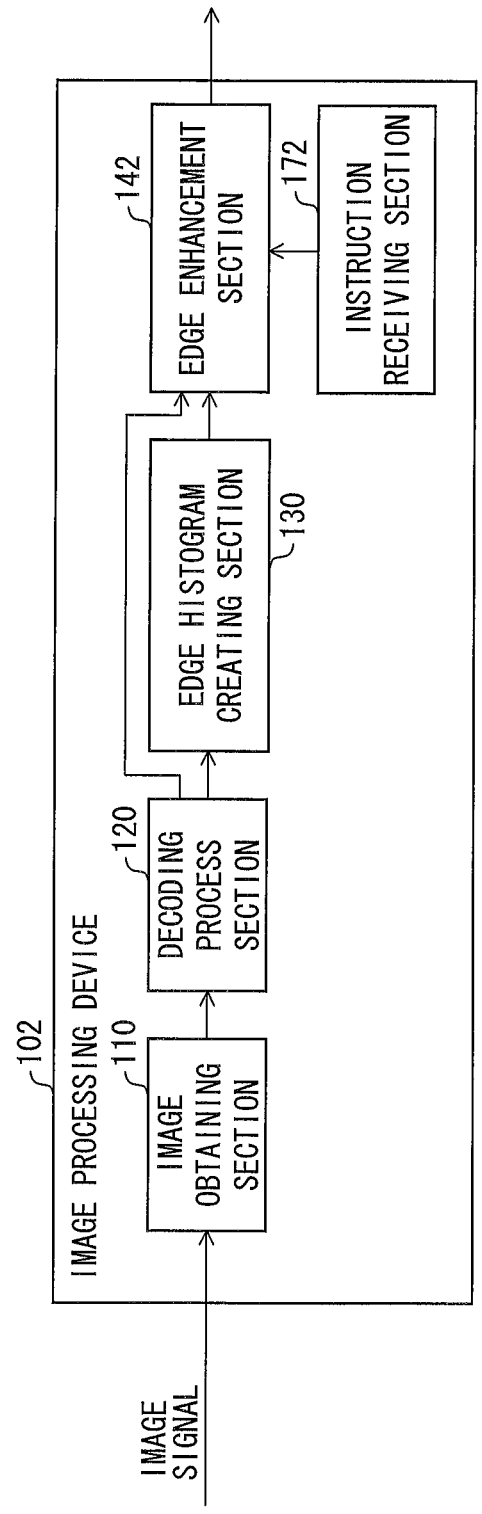
FIG. 10 is a functional block diagram illustrating a configuration of an image processing device according to Embodiment 4.

The above embodiments may be modified such that the activation and deactivation of the function of switching the edge enhancement filters in the edge enhancement section 140 or 141 may be switched over according to user's instruction. FIG. 10 is a functional block diagram illustrating a configuration of an image processing device 102 according to Embodiment 4, which is a modification of Embodiment 1. As illustrated in FIG. 10, compared with the image processing device 100 illustrated in FIG. 1 the image processing device 102 is different in that the image processing device 102 includes an edge enhancing section 142, instead of the edge enhancing section 140, and further includes an instruction receiving section 172.

The instruction receiving section 172 receives a setting instruction, which instructs to use which mode to perform the edge enhancement. The modes includes (1) a "weak" shoot reduction mode in which the edge enhancement is performed with the first edge enhancement filter, (2) an "intermediate" shoot reduction mode in which the edge enhancement is performed with the second edge enhancement filter, (3) a "strong" shoot reduction mode in which the edge enhancement is performed with the third edge enhancement filter, and (4) an "automatic" mode in which the edge enhancement is performed with an edge enhancement filter suitable for the first ratio.

The edge enhancement section 142 selects the edge enhancement filter according to the mode instructed via the instruction receiving section 172. That is, the edge enhancement section 142 uses the first edge enhancement filter regardless of the first ratio, when the "weak" shoot reduction mode is instructed. The edge enhancement section 142 uses the second edge enhancement filter regardless of the first ratio, when the "intermediate" shoot reduction mode is instructed. The edge enhancement section 142 uses the third edge enhancement filter regardless of the first ratio, when the "strong" shoot reduction mode is instructed. The "weak" shoot reduction mode, the "intermediate" shoot reduction mode, and the "strong" shoot reduction mode are modes in which the function of switching over the shoot components according to the first ratio is turned OFF.

On the other hand, if the "automatic" mode is instructed, the edge enhancement section 142 selects an edge enhancement filter according to the first ratio as described in Concrete Example 1 or 2 in Embodiment 1, and performs the edge enhancement with the edge enhancement filter thus selected. The "automatic" mode is a mode in which the function of switching over the shoot components according to the first ratio is turned ON.

Embodiment 5

In the embodiments described above, the edge enhancement sections 140 and 141 treat the whole screen of the frame, but may be configured to treat only a block(s), which is part of the screen.

For example, the edge histogram creating section 130 creates an edge histogram for each of blocks constituting a frame, and calculates a first ratio per block. In this case, the first ratio is a value obtained by dividing the number of pixels having the interproximal pixel luminance difference greater than or equal to the first threshold in a block by the total number of pixels in the block. The edge enhancement section 140 or 141 may be configured to select an edge enhancement filter per block according to the first ratio of the block.

Embodiment 6

Figure 11:
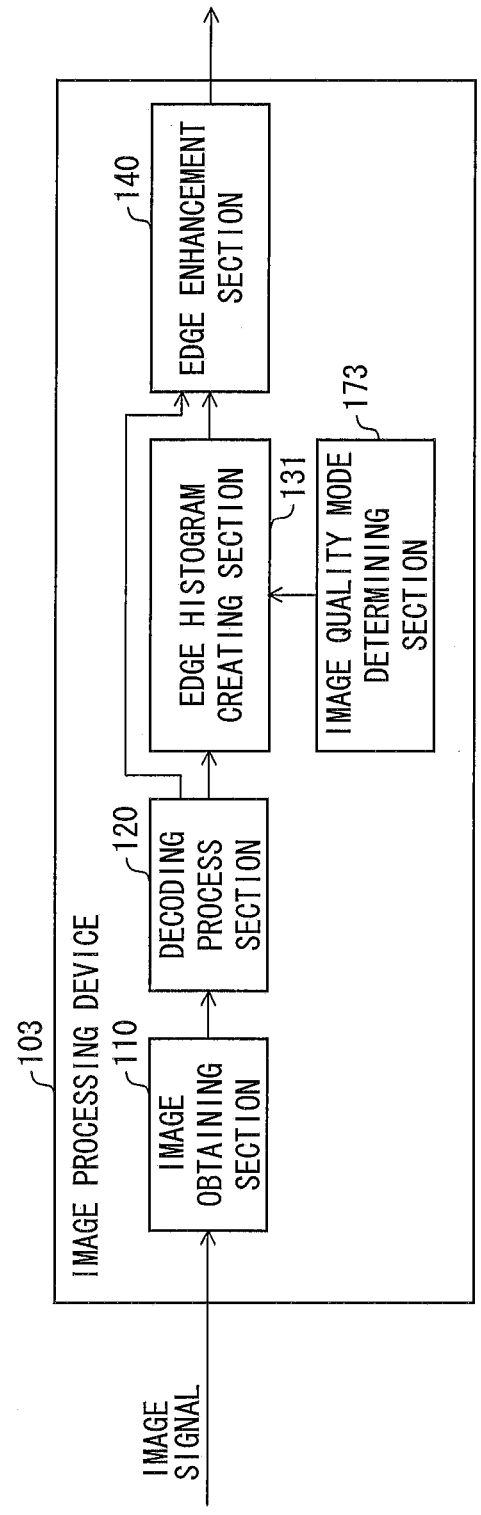
FIG. 11 is a functional block diagram illustrating a configuration of an image processing device according to Embodiment 6.

Embodiment 6, another embodiment of the present invention, is described here referring to FIG. 11. For the sake of easy explanation, members having the same functions as those explained with reference to the drawings in the Embodiments described above, are given the same reference signs.

The present embodiment is one in which the extent of the edge enhancement is changed according to an image quality mode selected by a user. FIG. 11 is a functional block diagram illustrating a configuration of an image processing device 103 according to Embodiment 6. As illustrated in FIG. 11, compared with the image processing device 100 illustrated in FIG. 1, the image processing device 103 is different in that the image processing device 103 includes an edge histogram creating section 131 instead of the edge histogram creating section 130, and further includes an image quality mode determining section 173.

The image quality mode determining section 173 determines an image quality mode of an image to be displayed on the display unit 400. The image quality mode determining section 173 determines the image quality mode according to user's input. For example, the image quality modes includes standard mode, dynamic mode, movie mode, etc. The standard mode is a general-purpose mode suitable for watching various image contents at home. The dynamic mode is a mode in which colors are deepened and contours are enhanced, for example, in order to be eye-catching at storefronts. The movie mode is a mode for realizing a film-like image (as if seen in a movie theater) by reproducing the image in a way suitable for tone reproduction.

The edge histogram creating section 131 has a function of changing, according to the image quality mode determined by the image quality mode determining section 173, the first threshold and the section threshold illustrated in FIG. 5, in addition to the function of the edge histogram creating section 130 described in Embodiment 1.

In a concrete example, the edge histogram creating section 131 stores a first threshold and a second threshold for the standard mode, a first threshold and a second threshold for the dynamic mode, and a first threshold and a second threshold for the movie mode, where the first thresholds and the second thresholds satisfy that the first threshold for the dynamic mode>the first threshold for the standard mode>the first threshold for the movie mode, and the second threshold for the dynamic mode>the second threshold for the standard mode>the second threshold for the movie mode. The edge histogram creating section 131 calculates the first ratio, the second ratio, and the third ratio by using the first threshold and the second threshold corresponding to the image quality mode determined by the image quality mode determining section 173, and outputs the first ratio, the second ratio, and the third ratio to the edge enhancement section 140.

Figure 12:
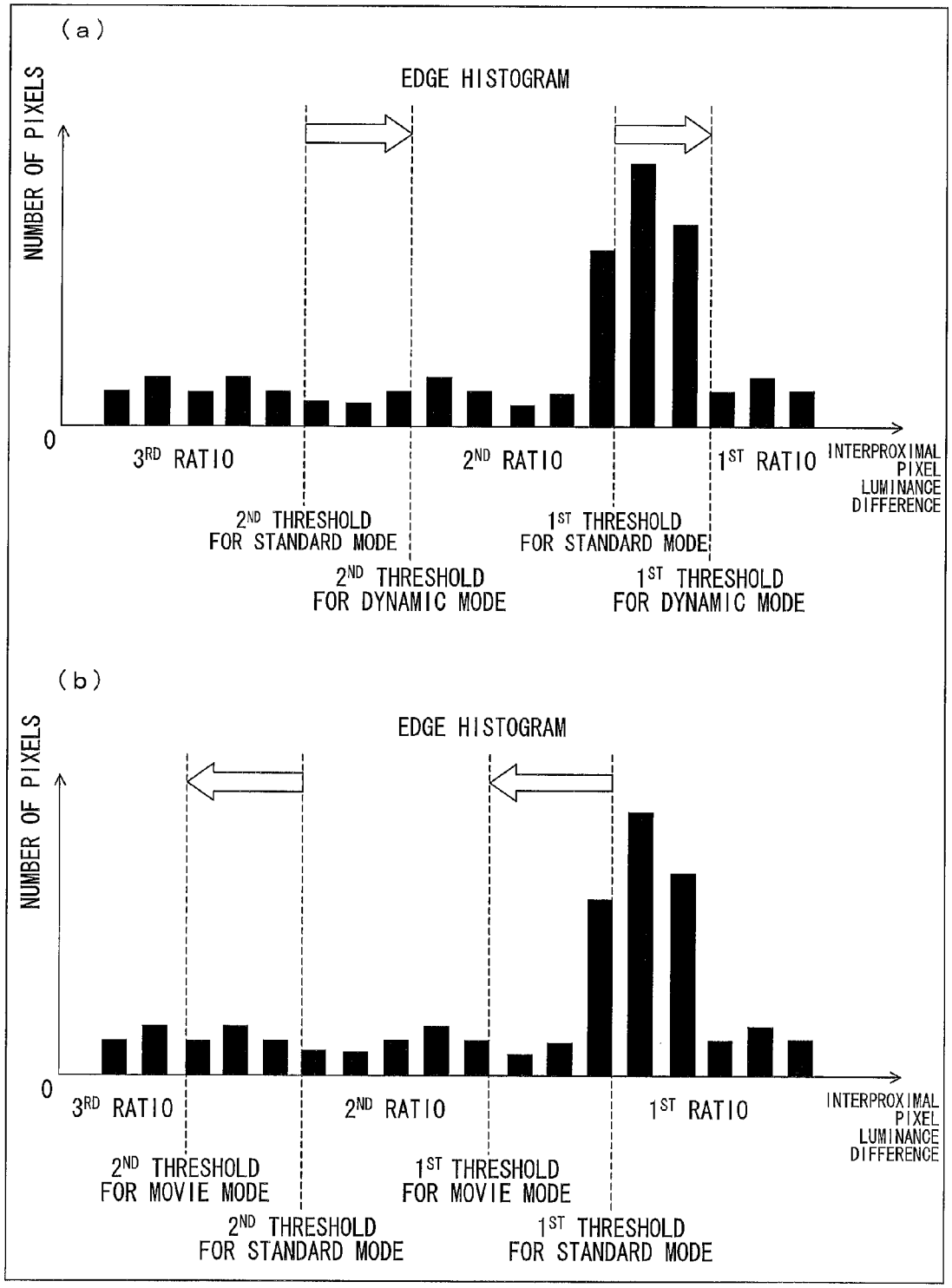
FIG. 12 is a view for explaining a threshold difference due to a difference in image quality mode.

(a) of FIG. 12 illustrates relationships between the first threshold and second threshold for the standard mode and the first threshold and second threshold for the dynamic mode. As illustrated in (a) of FIG. 12, the first threshold and the second threshold for the dynamic mode are shifted toward larger interproximal pixel luminance difference, compared with the first threshold and the second threshold for the standard mode. Thus, the first ratio indicating the ratio of the component having larger interproximal pixel luminance difference is smaller in the dynamic mode than in the standard mode. As a result, the edge enhancement section 140 can perform greater edge enhancement in the dynamic mode than in the standard mode according to the filter selecting table of FIG. 6, thereby realizing in the dynamic mode an image in which the contours are relatively enhanced.

Moreover, (b) of FIG. 12 illustrates relationship between the first threshold and second threshold for the standard mode and the first threshold and second threshold for the movie mode. As illustrated in (b) of FIG. 12, the first threshold and the second threshold for the movie mode are shifted toward smaller interproximal pixel luminance differences, compared with the first threshold and the second threshold of the standard mode. Thus, the first ratio indicating the ratio of the component having larger interproximal pixel luminance difference is larger in the movie mode than in the standard mode. As a result, the edge enhancement section 140 can perform weaker edge enhancement in the movie mode than in the standard mode according to the filter selecting table of FIG. 6, thereby realizing in the movie mode a film-like image without excess contour edge enhancement.

The first threshold and the second threshold for the standard mode are intermediate between the first threshold or the second threshold for the dynamic mode and the first threshold or the second threshold for the movie mode, correspondingly. Thus, the standard mode (i) makes it possible to carry out a contour edge enhancement suitable for watching a general broadcast at home and (ii) is distinguishable from the other modes.

It should be noted that the above explanation discusses a case where the treatment corresponding to Concrete Example 2 in Embodiment 1 is performed in the present embodiment. For performing the treatment corresponding to Concrete Example 1 in Embodiment 1, the edge histogram creating section 131 may be configured such that the edge histogram creating section 131 stores in advance the first threshold for the standard mode, the first threshold for the dynamic mode, and the first threshold for the movie mode (where the first threshold for the dynamic mode>the first threshold for the standard mode>the first threshold for the movie mode), and calculates the first ratio by using the first threshold corresponding to the image quality mode determined by the image quality mode determining section.

In the present embodiment, the image processing device 103 may be configured to perform image quality adjustment in terms of luminance, contrast, or the like according to the image quality mode determined by the image quality mode determining section 173. The image quality adjustment may be performed on the basis of a conventionally well-known technique, and therefore its detailed explanation is omitted here.

Embodiment 7

In any of the embodiments, examples of a source from which the image obtaining section 110 obtains the image signal include the followings.
(Example 1 of image signal source) The image signal is obtained from analog image broadcast waves.
(Example 2 of image signal source) The image signal is obtained from digital image broadcast waves.
(Example 3 of image signal source) The image signal is obtained from a recording medium such as Blu-ray (Registered Trademark) disc, DVD (Digital Versatile Disk), HDD, or the like.
(Example 4 of image signal source) The image signal is obtained from broadcast waves such as IP broadcast waves, CATV broadcast waves, or the like.
(Example 5 of image signal source) The image signal is obtained from an external device, such as an external image storing device, an external image obtaining device.
<Others>
The image obtaining section 110, the decoding process section 120, the edge histogram creating sections 130 and 131, the edge enhancement sections 140, 141, and 142, the scene identity level detecting section 151, the motion level detecting section 161, the instruction receiving section 172, and the quality image mode determining section 173 may be realized by using hardware such as circuit devices for realizing these functions, or may be constituted by using a computing device such as a microcomputer or a CPU (Central Processing Unit), and software for specifying operation of the computing device.

As to the processes of the functional sections of the image processing devices 100, 101, 102, described above in the embodiments, the processes may be realized by storing in a computer-readable recording medium, a program for realizing the process(es) and causing a computer system to read and run the program stored in the recording medium. Here, the "computer system" includes an OS (Operating System) and a hardware such as a peripheral device.

The program may be one to realize part of the functions, or may be one to realize the function(s) when used in combination with a program stored in the computer system.

Moreover, the concept of "recording medium" in which the program is stored encompasses a computer-readable portable medium such as a flexible disc, a magneto-optical disk, a ROM (Read Only Memory), CD-ROM, or the like, or a storage such as a hard disc built in a computer system. Further, the concept of the "recording medium" further encompasses (i) transitory media for dynamically storing the program in a short time, such as communication lines for transmitting the program via a communication link such as a network (such as the Internet), a telecommunication line, or the like, and (ii) media for holding the program in a certain period of time, such as volatile memories in a server or a client computer system used in transmitting the program.

Embodiment 8

A lot of images displayed on display devices include text information. For example, television receivers often display an image with many texts, such as text broadcasting, a recorded program content list, a program guide, or the like. For this reason, the text information on the television receivers have become an important tool for information communication for viewers, rather than a supplemental tool.

Despite this, some television receivers have no function of heightening visibility of the text information, and are configured to display the text information with an image quality setting for a main image which is mainly displayed. In this case, for example, if enhancement (contour enhancement) for the main image is set to be higher, the enhancement for the text information is also strengthened unnecessarily, which would possibly cause white bordering of texts, thereby reducing the visibilities of the texts.

In view of this, various techniques have been developed for heightening the visibility of such text information in various imaging devices as typified by television receivers. For example, Patent Literature 2 listed above discloses a technique for heightening visibility of texts contained in an image. The technique extracts texts from an image and performs edge enhancement, contrast intensifying process, and text color concentration adjusting process to the texts thus extracted.

However, the process performed by the technique described in Patent Literature 2 is not sufficiently efficient. For example, Patent Literature 2 adopts a configuration in which the text extraction is performed by carrying out color information clustering process, binarization process, noise removing process, etc. These processes involve complicate logics, thereby being relatively time-consuming. Especially, display of recent image contents, which have higher resolution and higher frame rate, would become so instable that the image is stopped if the text extraction takes time as described above.

Configurations described in the following embodiments are made in view of the afore-mentioned problems, and an object of the configurations are to provide an image processing device capable of efficiently heightening visibility of text contained in an image.

In the following, Embodiment 8 of the present invention is described, referring to FIGS. 13 to 19. In Embodiment 8, explained is a technique in which it is determined whether an image contains text or not on the basis of features of the image, and if it is determined that the image contains text, text enhancement (edge enhancement) is performed to the image. It should be noted that an image processing device 200 in Embodiment 8 may be configured such that any of the edge enhancements described in Embodiments 1 to 6 is performed instead of the text enhancement explained in Embodiment 8.

(Mechanical Configuration of Image Processing Device 200)

Figure 13:
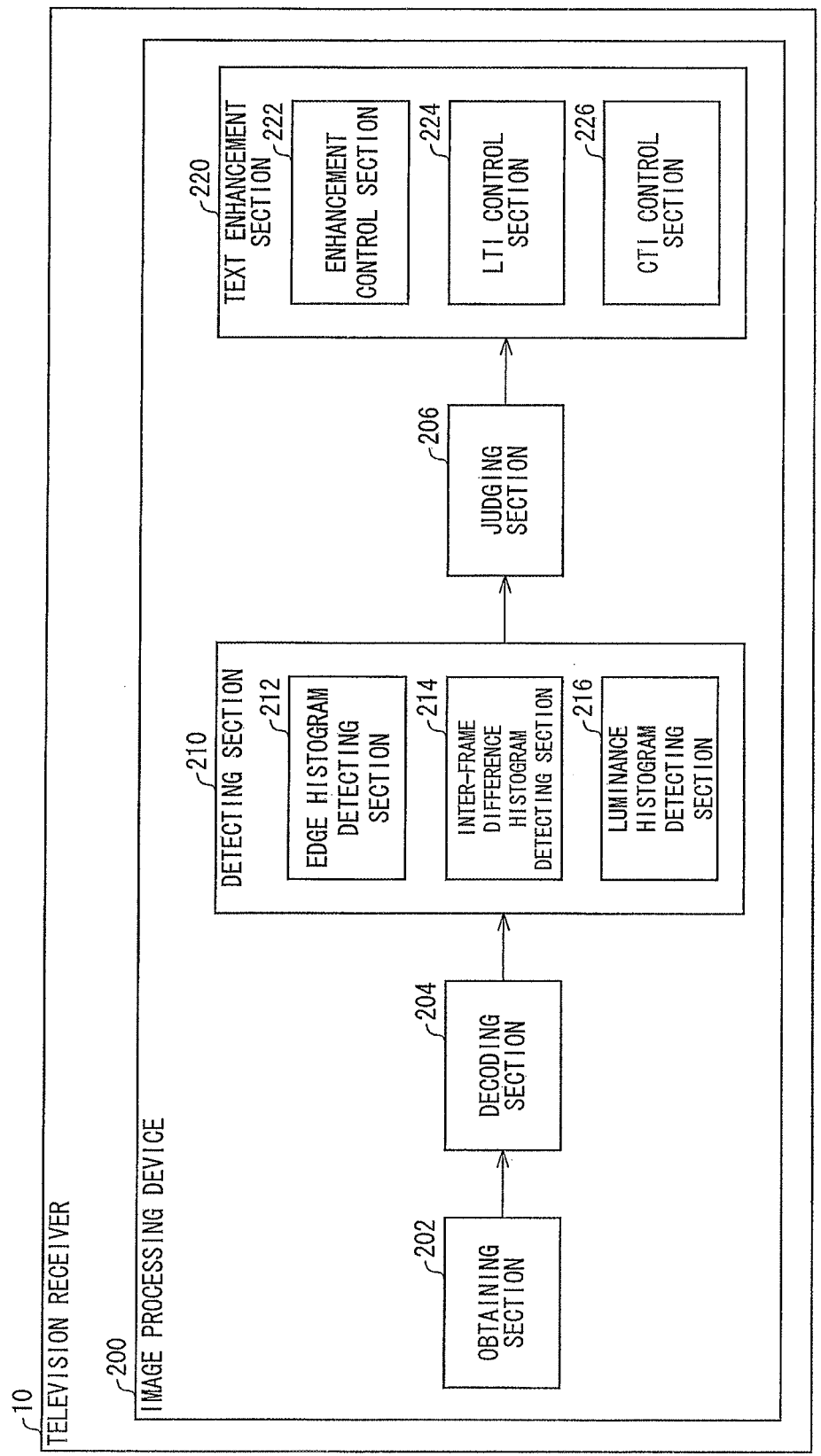
FIG. 13 is a block diagram illustrating a functional configuration of an image processing device according to Embodiment 8 of the present invention.

FIG. 13 is a block diagram illustrating a functional configuration of the image processing device 200 according to Embodiment 8 of the present invention. The image processing device 200 is a device capable of performing a process for heightening visibility of text contained in an image. The image processing device 200 can be mounted on various imaging devices (such as television receivers, various recorders, and the like) dealing with image data. Here, the present embodiment describes a case where the image processing device 200 is mounted on a television receiver 10. The television receiver 10 has a configuration similar to that of general television receivers, except that the television receiver 10 includes the image processing device 200. Thus, detailed explanation on the television receiver 10 is omitted here.

As illustrated in FIG. 13, the image processing device 200 includes an obtaining section 202, a decoding section 204, a detecting section 210, a judging section 206, and a text enhancement section 220.

(Obtaining Section 202)

The obtaining section 202 is configured to obtain image data (image signal) to be processed. For example, the obtaining section 202 obtains image data received via a tuner provided to the television receiver 10, image data inputted via an external device (such as an HDD (Hard Disk Drive) recorder, a BD (Blu-ray Disc (Registered Trademark) recorder, or the like) connected to the television receiver 10, image data stored in a recording medium of various kinds (such as an HDD, optical disc, memory card, or the like) attached to the television receiver 10, or the like image data. It should be noted that the kinds of the image data to be obtained by the obtaining section 202 and where the image data comes from are not limited to the examples listed above.

(Decoding Section 204)

The decoding section 204 is configured to decode the image data obtained by the obtaining section 202. In some cases, the image data thus obtained by the obtaining section 202 are encoded according to an encoding method (such as MPEG-1, MPEG-2, H.264/MPEG-4, AVC, or the like). In such cases, the decoding section 204 decodes the image data, which has been obtained by the obtaining section 202, with a decoding method that corresponds to the encoding method which has been applied to the image data. Some cases the obtaining section 202 would receive not-encoded image data. In such cases, the decoding process performed by the decoding section 204 is not necessary. Therefore, the image processing device 200 may be configured without the decoding section 204.

(Detecting Section 210)

The detecting section 210 is configured to detect various features of an image represented by the image data thus obtained by the obtaining section 202. The detecting section 210 includes an edge histogram detecting section 212, an inter-frame difference histogram detection section 214, and a luminance histogram detecting section 216.

The edge histogram detecting section 212 detects an edge histogram of the image as the features. The edge histogram (i) is a frequency distribution of second differences as to pixels in the frame constituting the image and (ii) is statistic data regarding the second differences each of which is a difference in luminance between a pixel and another pixel adjacent to the pixel.

The inter-frame difference histogram detecting section 214 detects an inter-frame difference histogram of the image as the features. The inter-frame differences histogram (i) is a frequency distribution of first differences as to pixels in the frame constituting the image and (ii) is statistic data regarding the first differences each of which is a difference in luminance between frames (i.e., a target frame and a frame preceding the target frame).

The luminance histogram detecting section 216 detects the luminance histogram of the image as the features. The luminance histogram is a frequency distribution of luminances as to pixels in the frame constituting the image and is statistic data regarding the luminances.

(Judging Section 206)

The judging section 206 is configured to judge whether or not text is contained in the image data thus obtained by the obtaining section 202. The judging section 206 makes the judgment, on the basis of the various features (edge histogram, inter-frame histogram, and luminance histogram) thus detected by the detecting section 210.

The judgment on whether or not text is contained does not mean to judge whether or not at least one character is contained, but to judge whether or not characters as many as needing the process of the text enhancement section 220 are contained in the image data.

(Text Enhancement Section 220)

The text enhancement section 220 is configured to perform, for the image, a process for heightening visibility of the text contained in the image represented by the image data. The text enhancement section 220 includes an enhancement control section 222, an LTI control section 224, and a CIT control section 226. The enhancement control section 222 weakens the enhancement of the image in order to heighten the visibility of the text contained in the image represented by the image data. The LTI control section 224 intensifies LTI (Luminance Transient Improvement) for the image in order to heighten the visibility of the text contained in the image represented by the image data. That is, the text enhancement section 220 enhances an edge portion of the image by causing a gradient of a luminance changing rate over the edge portion to be steep, but not adding a shoot component to the edge portion. The CTI control section 226 controls CIT (Color Transient Improvement) for the image in order to heighten the visibility of the text contained in the image represented by the image data.

[Flow of Image Processing Performed by Image Processing Device 200]

Figure 14:
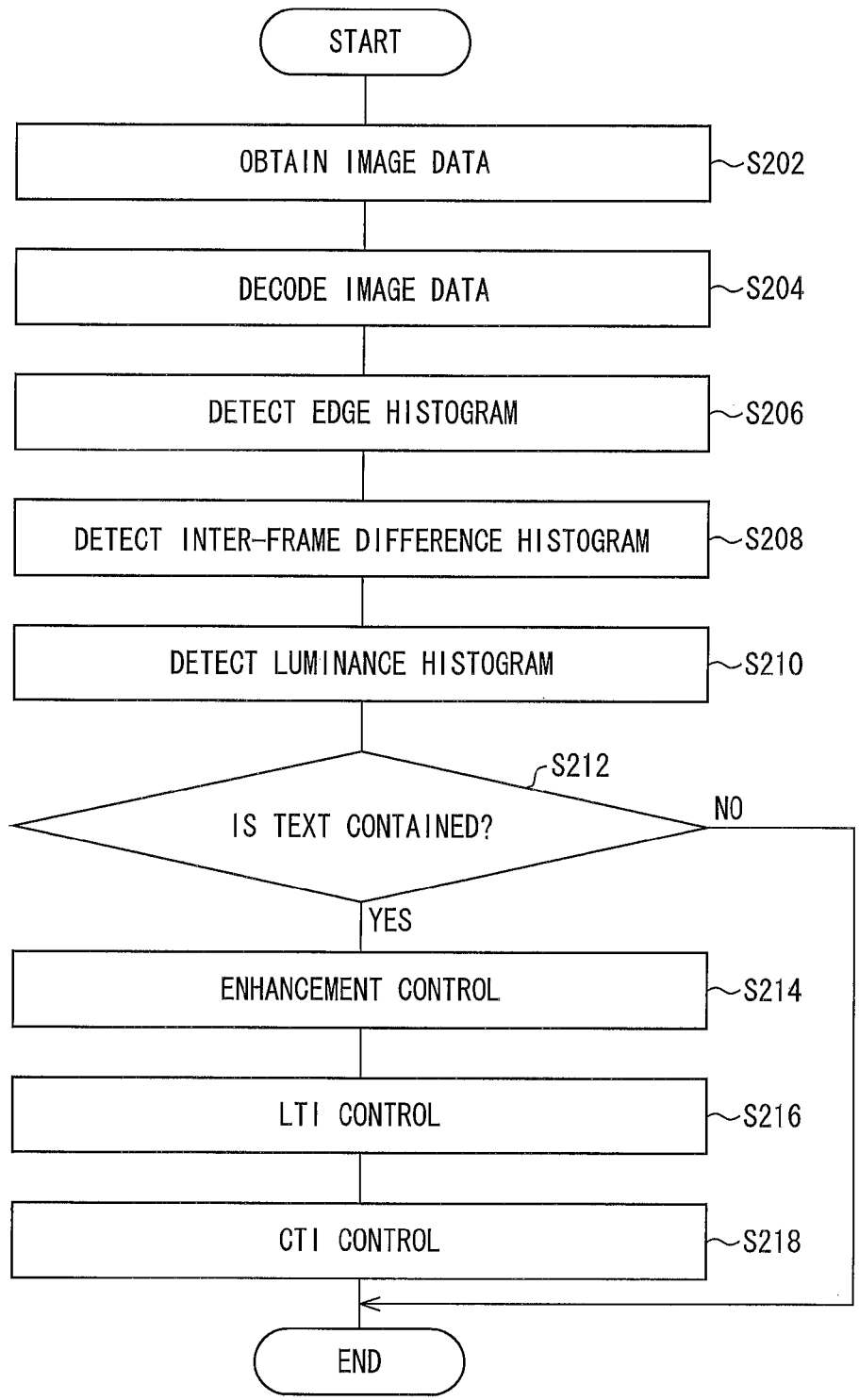
FIG. 14 is a flowchart illustrating a flow of an image processing performed by the image processing device according to Embodiment 8 of the present invention.

Next, referring to FIG. 14, a flow of an image processing performed by the image processing device 200 according to Embodiment 8 of the present invention is explained. FIG. 14 is a flow chart illustrating the flow of the image processing performed by the image processing device 200 according to Embodiment 8 of the present invention.

(Obtaining Step and Decoding Step)

Firstly, the obtaining section 202 obtains image data to be processed (Step S202). Then, the decoding section 204 decodes the image data thus obtained at Step S202 (Step S204).

(Detecting Step)

Next, the edge histogram detecting section 212 detects, from the image data thus decoded at Step S204, an edge histogram of the image represented by the image data (Step S206). Moreover, the inter-frame difference histogram detecting section 214 detects, from the image data thus decoded at Step S204, an inter-frame difference histogram of the image represented by the image data (Step S208). Furthermore, the luminance histogram detecting section 216 detects, from the image data thus decoded at Step S204, a luminance histogram of the image represented by the image data (Step S210).

(Judging Step)

On the basis of the edge histogram thus detected at Step S206, the inter-frame difference thus detected at Step S208, and the luminance histogram thus detected at Step S210, the judging section 206 judges whether or not text is contained in the image (Step S212). If the judge section 206 judges at Step S212 that "no text is contained" (No at Step S212), the image processing device 200 ends the image processing.

(Text Contrast Control Step)

On the other hand, if the judge section 206 judges at Step S212 that "text is contained" (Yes at Step S212), the enhancement control section 222 weakens the enhancement of the image in order to heighten visibility of the text contained in the image (Step S214). Then, LTI control section 224 intensifies the LTI of the image in order to heighten visibility of the text contained in the image (Step S216). Further, the CTI control section 226 controls the CTI of the image in order to heighten visibility of the text contained in the image (Step S218). Then, the image processing device 200 ends the image processing.

For example, when it is judged that "text is contained in the image", the CTI control section 226 heighten the CTI of the image, thereby heightening color contrast at an edge portion of the text (that is, causes a gradient of a change in a color difference signal to be steep), in order to heighten visibility of the text contained in the image.

However, for an image for which fineness is required, such as a still image, this treatment, in some cases, would adversely result in quality deterioration of the text display by causing jaggy near the text to be more visible.

Therefore, for the image required to have fineness, it is preferable that the CTI control section 226 adjusts the CTI in such a way that the CTI will not be heightened excessively.

The image processing explained above is to describe image processing for a frame. For image data containing a plurality of frames, the image processing device 200 repeats the image processing. The image processing device 200 may repeat the image processing per frame or per batch of frames. Moreover, the image processing device 200 may perform the image processing to the frame(s) just before the frame(s) are displayed, or may perform the image processing to a frame(s) stored in a frame memory or the like.

[Concrete Example of Judging Process on Luminance Histogram]

FIG. 15 illustrates an example of a luminance histogram detected from an image, in an image processing device 200 according to Embodiment 8. The luminance histogram as illustrated in FIG. 15 (i) is a frequency distribution of luminances obtained by the luminance histogram detecting section 216 as to pixels in an image and (ii) is statistic data of the luminances. In the luminance histogram, the horizontal axis indicates tones (luminance), and the vertical axis indicates the number of pixels (frequency).

The judging section 206 of the image processing device 200 judges, on the basis of an illumination histogram detected from an image as describe above, whether or not the image contains text. More specifically, the judging section 206 judges that an image "contains text", if the following conditions (1) and (2) are satisfied in the illumination histogram detected in the image.

(1) Two or more tones (luminance) whose numbers of pixels are greater than or equal to a fifth threshold exist in the image, where the fifth threshold is the number of pixels which is 6% of the total number of pixels in the image.

(2) The number of pixels having a tone, which is adjacent to a tone whose number of pixels is greater than or equal to the fifth threshold, is less than or equal to a sixth threshold, where the sixth threshold is the number of pixels which is 1% of the total number of pixels in the image.

The reasons for adopting the conditions (1) and (2) are as follows. In a region in which text information is displayed in an image, in many cases, a background portion is in a monotone pattern, that is, the background portion is fixed to one tone. Meanwhile, in many cases, the text portion is also fixed to one tone. The inventors of the present invention found that the luminance histogram detected from an image containing text information tends to have a distinct peak of the number of pixels at least in the two tones, namely, the tone in the background portion, and the tone in the text portion.

For example, in the luminance histogram illustrated in FIG. 15, the number of pixels in a third tone and an eleventh tone from the lower luminance side (left side of FIG. 15) exceeds 6% (fifth threshold) of the total number of pixels. Thus, the luminance histogram illustrated in FIG. 15 satisfies the condition (1).

Moreover, the luminance histogram as illustrated in FIG. 15 is such that a second tone, a fourth tone, a tenth tone, and a twelfth tone from the lower luminance side (the left side of FIG. 15) are "next tones", and the numbers of pixels in these tones are greater than or equal to 1% of the total number of pixels (the sixth threshold). Therefore, the luminance histogram as illustrated in FIG. 15 satisfies the condition (2).

That is, the luminance histogram as illustrated in FIG. 15 satisfy both the conditions (1) and (2). Accordingly, the judging section 206 judges that "text is contained" in the image from which the luminance histogram is detected.

[Concrete Example of Judging Process on the Basis of Inter-Frame Difference Histogram]

FIG. 16 illustrates one example of an inter-frame difference histogram detected in an image, in an image according to Embodiment 8. The inter-frame difference histogram as illustrated in FIG. 16 (i) is a frequency distribution of first differences obtained by the inter-frame difference histogram detecting section 214 as to pixels in an image and (ii) is statistic data of the first differences each of which is a difference in luminance between frames (i.e., a target frame and a frame preceding the target frame). In the inter-frame difference histogram, the horizontal axis indicates the first difference, and the vertical axis indicates the number of pixels (frequency).

The judging section 206 of the image processing device 200 thus judges, on the basis of an inter-frame difference histogram detected from an image, whether or not the image contains text. More specifically, the judging section 206 judges that an image "contains text", when the following condition (3) is satisfied in the inter-frame difference histogram detected in the image.

(3) The number of "dynamic pixels" is equal to a fourth threshold, where the "dynamic pixels" are pixels whose first difference value is greater than or equal to the third threshold which is a threshold for the first difference value and is assumed to be "25" here, and the fourth threshold is the number of pixels which is 20% of the total number of pixels.

A reason why the condition (3) is adopted is as follows. The inventors of the present invention found that, in many cases, a region in which text information is displayed in an image is still without motion between frames. Therefore, an increase or expansion in a region(s) in which text information is displayed tends to result in a reduction in the number of "dynamic pixels".

For example, in the inter-frame difference histogram as illustrated in FIG. 16, the pixels are classified into pixels "with no difference", pixels "with little difference" and pixels "with large difference". Into the pixels "with no difference", classified are pixels whose first difference is in a range of 0 to 1. Such pixels whose first difference is in the range of 0 to 1 are considered to be static pixels. Into pixels "with little difference", classified are pixels whose first difference is in a range of 2 to 24. Such pixels whose first difference is in a range of 2 to 24 are also considered to be static pixels, because the first difference is deemed to be caused by noise. Into the pixels with "large difference", classified are pixels whose first difference is in a range of 25 to 1023. Such pixels whose first difference is in a range of 25 to 1023 are considered to be dynamic pixels.

In the inter-frame difference histogram as illustrated in FIG. 16, the number of pixels "with large difference" (that is, "dynamic pixels") is less than or equal to the fourth threshold. Therefore, the inter-frame difference histogram as illustrated in FIG. 16 satisfies the condition (3). Accordingly, the judging section 206 judges that "text is contained" in the image from which the inter-frame difference histogram is detected.

In the present embodiment, the fourth threshold is set to 20% of the total number of pixels, thereby setting some allowance in motion in pixels in images. This is because there are cases in which pixels depicting motions would be contained even in images displaying many pieces of text information in some cases such as a thumbnail moving picture of a program content selected on a recorded program content list, animation display of text information, user operation on a program content list (for example, cursor movement or the like), and the like.

[Concrete Example of Judging Process on the Basis of Edge Histogram]

FIG. 17 illustrates one example of an edge histogram detected from an image, in the image processing device 200 according to Embodiment 8 of the present invention. The edge histogram as illustrated in FIG. 17 (i) is a frequency distribution of second differences obtained by the edge histogram detecting section 212 as to pixels in an image and (ii) is statistic data of the second differences each of which is a difference in luminance between a pixel and another pixel adjacent to the pixel in the horizontal direction. In the edge histogram, the horizontal axis indicates the second difference and the vertical axis indicates the number of pixels (frequency).

The judging section 206 of the image processing device 200 thus judges, on the basis of an edge histogram detected from an image, whether or not the image contain text. More specifically, the judging section 206 judges that "text is contained" in an image if the following condition (4) is satisfied in an edge histogram detected from the image.

(4) The number of "pixels in edge portions" is greater than or equal to an eighth threshold, where the "pixels in edge portions" are pixels whose second difference is greater than or equal to a seventh threshold that is a threshold for the second difference and is assumed to be "319" here, and the eighth threshold is the number of pixels which is 1% of the total number of the pixels.

A reason why the condition (4) is adopted is as follows. In many cases, luminance of text information contained in an image is set to increase contrast between the text information and a background. The inventors of the present invention found that the number of "pixels in edge portions" tends to increase as such text information is increased in an image.

For example, in the edge histogram as illustrated in FIG. 17, the number of the "pixels in edge portions", that is, the pixels having a second difference of "319" or greater is greater than or equal to the eighth threshold. Therefore, the edge histogram as illustrated in FIG. 17 satisfies the condition (4). Accordingly, the judging section 206 judges that "text is contained" in the image from which the edge histogram is detected.

[Concrete Example of Process for Adjusting Enhancement]

Figure 18:
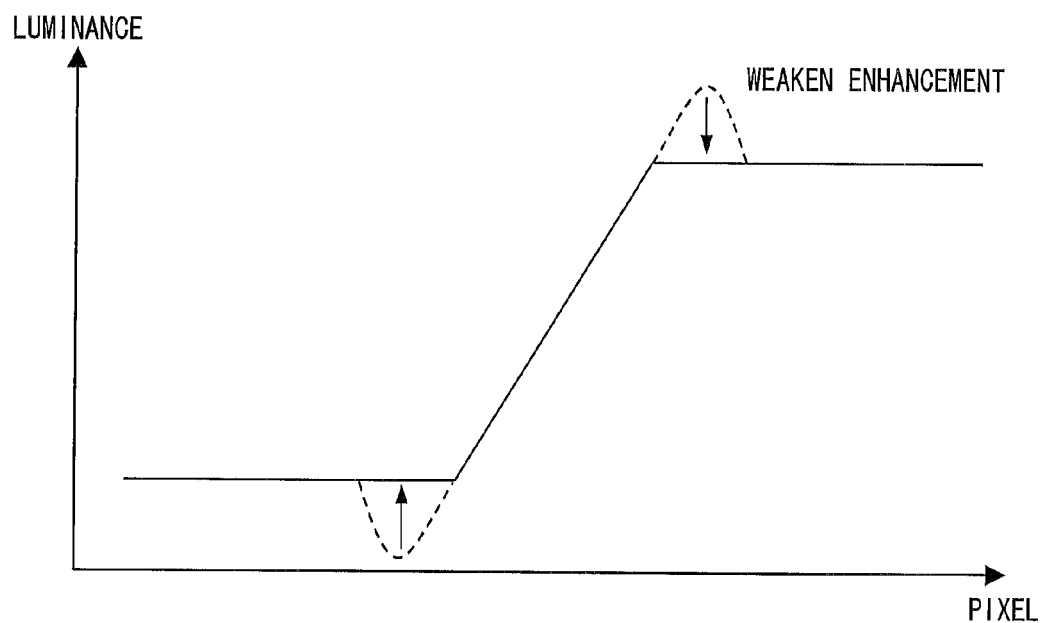
FIG. 18 is a view illustrating concept of a process of adjusting an extent of enhancement which process is performed by the image processing device according to Embodiment 8 of the present invention.

FIG. 18 illustrates concept of the process for adjusting enhancement by the image processing device 200 according to Embodiment 8 of the present invention. FIG. 18 illustrates luminance near an edge obtained from an image. In FIG. 18, the horizontal axis indicates a coordinate of pixels, and the vertical axis indicates luminance.

If it is judged that "text is contained" in an image, the enhancement control section 222 weakens enhancement of the image in order to heighten visibility of the text contained in the image. The weakening of enhancement removes shoot component (overshoot or undershoot) from an edge portion of the text.

For example, the enhancement control section 222 performs the removal of the shoot component by reducing a setting value for setting the enhancement by four (4) in the image quality setting of the television receiver 10. More specifically, the setting value for setting the enhancement in the television receiver 10 has been initially set to "+4" in a case where the image quality mode is "dynamic". In this case, the enhancement control section 222 changes the setting value for setting the enhancement from "+4" to "0".

Similarly, in a case where the setting value for setting the enhancement is set to "+8", the enhancement control section 222 changes the setting value from "+8" to "+4". In a case where the setting value for setting the enhancement is set to "+10", the enhancement control section 222 changes the setting value from "+10" to "+6".

With this arrangement, the shoot component in an edge portion of text in the image to be processed is removed. In general, an increase in enhancement forms a shoot component at the edge portion by adding secondary differentiation of an original signal to the original signal. Meanwhile, a decrease in enhancement removes the shoot component formed in the edge portion.

However, the enhancement control section 222 will not set the setting value for setting the enhancement to be less than "0", which is an enhance-off state, in order to prevent blurring in the edge portion. For example, in a case where the setting value for setting the enhancement is set to "+2", the enhancement control section 222 will change the setting value from "+2" to "0", but not to "−2". Moreover, in a case where the setting value for setting the enhancement is set to be a value less than "0", which means that the shoot component has been already removed, the enhancement control section 222 will not change the setting value.

A general contour enhancement adopt such a method that enhancement is increased to form a shoot component in an edge portion. In the image processing device 200 according to the present embodiment, a shoot component in an edge portion is removed to heighten visibility of text. This is because, in the edge portion of text, the formation of shoot component would sometime make it difficult to see text adversely. Optionally, the enhancement setting may be changed gradually over a plurality of frames in order not to cause a viewer to sense oddness in an image due to a sudden change in the edge portion.

[Concrete Example of Adjustment Process of LTI]

Figure 19:
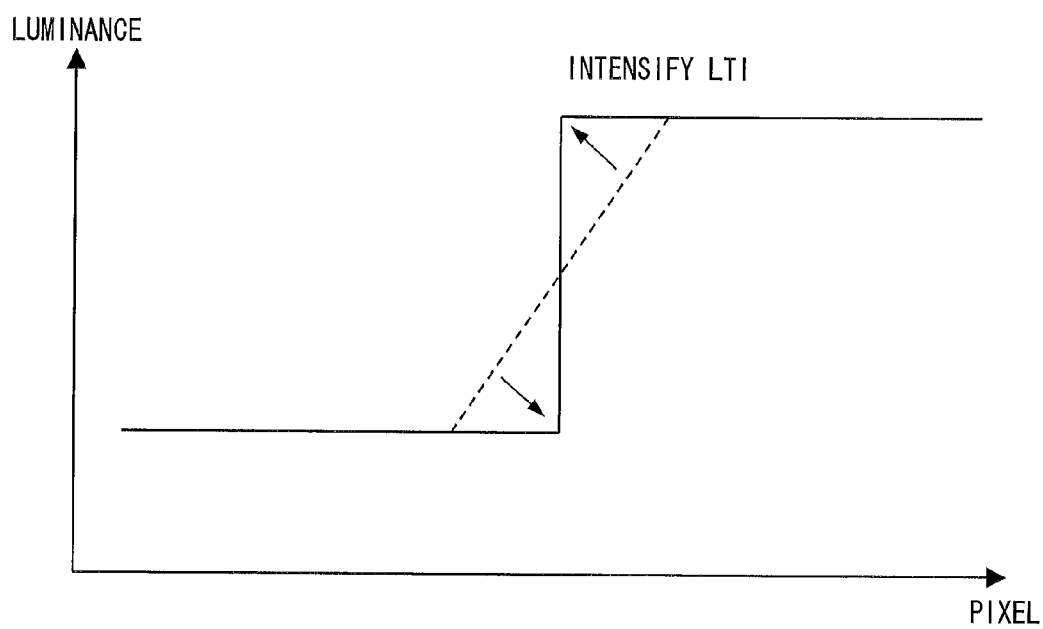
FIG. 19 is a view illustrating concept of a process of adjusting LTI performed by the image processing device according to Embodiment 8 of the present invention.

FIG. 19 illustrates concept of the process of adjusting LTI in the image processing device 200 according to Embodiment 8 of the present invention. FIG. 19 is a view illustrating luminance near an edge portion in an image in the image processing device 200 according to Embodiment 8 of the present invention. In FIG. 19, the horizontal axis represents a coordinate of pixels, and the vertical axis represents luminance.

In a case where it is judged that "the image contains text", the LTI control section 224 intensifies the LTI of the image, thereby increasing the luminance changing rate in the edge portion of text in order to heighten visibility of the text contained in the image.

For example, the television receiver 10 is configured such that a maximum setting value in the LTI setting is "63", and that the setting value of the LTI setting is set to "0" in a normal state. Accordingly, the LTI control section 224 changes the setting value of the LTI setting from "0" to "47". In this way, as illustrated in FIG. 18, the edge portion is enhanced by increasing the luminance changing rate in the edge portion in the image to be processed. A reason why the setting value of the LTI setting will not be changed to its maximum setting value is to reduce influence on slant in the image. In general, slant in an image more likely causes jaggy as the LTI is intensified.

As described above, the image processing device 200 according to the present embodiment heighten the visibility of text by, with respect to an image to be processed, by removing the shoot component in an edge portion and enhancing the edge portion in the image. In an image having been subjected to such image processing, even fine text is clearly visible. Optionally, the setting value of the LTI setting may be gradually changed over a plurality of frames in order not to cause a viewer to sense oddness in an image due to a sudden change in the edge portion.

[Program, Recording Medium]

Each function of the image processing device 200 described in Embodiment 8 may be realized by means of hardware by using logic circuits formed on an integrated circuit (IC chip), or by means of software by using a CPU (Central Processing Unit).

For example, the image processing device 200 includes a CPU (central processing unit) and memory devices (memory media). The CPU executes instructions in control programs realizing the functions. The memory devices include a ROM (read only memory) which contains programs, a RAM (random access memory) to which the programs are loaded, and/or a memory containing the programs and various data. Each of the functions of the present invention can also be achieved by the CPU reading out and running the program stored in the recording medium.

The storage medium may be, for example, a tape, such as a magnetic tape or a cassette tape; a magnetic disk, such as a Floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM, or a logic circuit or the like such as PLD (Programmable Logic Device), or FPGA (Field Programmable Gate Array).

The program may be made available to the image processing device 200 via a communication network. The communications network is not limited in any particular manner as long as the program can be at least transferred to the image processing device 200, and may be, for example, the Internet, an intranet, extranet, LAN, ISDN, VAN, CATV communications network, virtual dedicated network (virtual private network), telephone line network, mobile communications network, or satellite communications network.

The transfer medium for making the program available for the image processing device 200 may be of any kind, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR (High Data Rate), NFC (Near Field Communication), DLNA (Digital Living Network Alliance), mobile telephone network, satellite line, or terrestrial digital network.

[Supplemental Remarks]

(Regarding Detection Method)

In Embodiment 8 described above, the detection of whether an image contains text is performed by detection on the basis of edge histogram, detection on the basis of inter-frame difference histogram, and detection on the basis of luminance histogram. However, detection methods other than these may be employed.

(Regarding Regions to be Processed)

In Embodiment 8 described above, the process performed by the text enhancement section 220 (process to heighten visibility of text) is performed for the whole region of the image. However, the process performed by the text enhancement section 220 may be carried out for part of the whole region of the image. For example, it may be arranged that a text-displaying region in an image, which is a region in which text information is displayed, is identified in the image, and the process performed by the text enhancement section 220 is carried out for only the text-displaying region or for only the text-displaying region and a periphery of the text-displaying region. In this case, the identification of the text-displaying region may be carried out by any conventionally well-known method.

(Regarding Noise Reducing Process)

Moreover, in Embodiment 8, the enhancement, the LTI, and the CTI of an image are adjusted. However, various noise reducing processes such as high-frequency filter process (high-frequency component removing process), edge filter process (edge noise removing process), coring process (low-amplitude high-frequency component removing process), sharpness process (contour enhancement), and the like are applicable to process the image. In such a case, the noise removing process may be performed for the whole region of the image, or for part of the whole region of the image.

(Judging Condition)

Moreover, Embodiment 8 described above is arranged such that all of Conditions (1) to (4) are essential conditions, so that it is finally judged that an image "contains text, only if all of Conditions (1) to (4) are satisfied. That is, it is finally judged that an image "contains text, only if the three judging processes (judging process on the basis of inter-frame difference histogram, judging process on the basis of luminance histogram, and judging process on the basis of edge histogram) judge that the image "contains text. However, it may be arranged such that not all of Conditions (1) to (4) are essential conditions. In this case, it is finally judged that an image "contains text, only if an essential condition(s) among Conditions (1) to (4) is satisfied.

(Regarding Judging Process to be Performed)

In Embodiment 8 described above, all of the three judging processes (judging process on the basis of inter-frame difference histogram, judging process on the basis of luminance histogram, and judging process on the basis of edge histogram) are performed. However, it may be arranged such that part of the three judging processes (judging process on the basis of inter-frame difference histogram, judging process on the basis of luminance histogram, and judging process on the basis of edge histogram) is not performed. For example, it may be arranged such that the judging process on the basis of edge histogram is not carried out. However, in a case where only the judging process on the basis of inter-frame difference histogram and the judging process on the basis of luminance histogram are performed, it would be possibly difficult to accurately judge whether or not an image contains a text string, especially, in a case of animation images. In such a case, it becomes possible to perform accurate judgment on whether or not the image contains a text string, by further performing the judging process on the basis of edge histogram.

(Secondary Difference)

In Embodiment 8 described above, the judging process on the basis of edge histogram is carried out in such a way that the secondary difference used therein is a difference in luminance between a pixel and a pixel adjacent to the pixel in the horizontal direction. However, the secondary difference may be a difference in luminance between a pixel and a pixel adjacent to the pixel in any direction (the vertical direction, an oblique direction) other than the horizontal direction.

(Regarding the Thresholds)

Moreover, in Embodiment 8 described above, various thresholds (the third to the eighth thresholds) are exemplified as preferable examples. These thresholds are stored in advance in a memory or the like provided to the image processing device 200, and may be changed as appropriate. For example, it is preferable that the thresholds (the third to the eighth thresholds) are set as appropriate, depending on (i) types of imaging apparatus to which the image processing device 200 is mounted, (ii) kinds of the image inputted to the image processing device 200, and/or (iii) the like.

SUMMARY

As described above, an image processing device according to first aspect of the present invention is configured as an image processing device including an edge enhancement section configured to perform edge enhancement by adding a shoot component in a frame constituting an image, the image processing device including: a calculating section configured to calculate, for each of pixels constituting the frame, a luminance difference between a pixel and another pixel adjacent to the pixel, and to calculate a first ratio which is a ratio of pixels whose luminance difference is greater than or equal to a first threshold, the edge enhancement section performing the edge enhancement in such a way that the shoot component to be added is smaller for a frame having a larger first ratio.

In a case where edge enhancement for adding a shoot component (overshoot or undershoot) is carried out to an edge portion at which luminance differences between adjacent pixels are large, the shoot component would possibly cause white bordering, which results in glittering. However, with the configuration above, the edge enhancement is carried out in such a way that the shoot component to be added is smaller for a frame having a larger first ratio, which is the ratio of pixels greater than or equal to the first threshold. With this configuration, it is possible to reduce such white bordering in a frame having an edge in which adjacent pixels have large luminance differences therebetween. As a result, it is possible to reduce glittering, which is an adverse effect caused by edge enhancement.

Preferably, according to second aspect of the present invention, the image processing device is configured such that the calculating section further calculates a second ratio and a third ratio, the second ratio being a ratio of pixels whose luminance difference is (i) greater than or equal to a second threshold which is smaller than the first threshold and (ii) less than the first threshold, and the third ratio being a ratio of pixels whose luminance difference is less than the second threshold; and the edge enhancement section performs the edge enhancement in such a way that a shoot component, which is to be added for a frame whose second ratio is smaller than the third ratio, is smaller than a shoot component which is to be added for a frame whose second ratio is greater than the third ratio.

In images, a significant fraction of which is a single-color monotone region(s), the number of pixels is greater, between which a luminance difference is relatively small. Thus, in a case of an image satisfying the second ratio<the third ratio, the image is more likely to have a significant fraction that is a single-color monotone region(s). In such an image, edges are originally clear and there is no need of adding a large shoot component to such edges. With the configuration above, the edge enhancement is carried out in such a way that a shoot component is smaller for a frame, whose second ratio is smaller than the third ratio, than a shoot component for a frame whose second ratio is greater than the third ratio. This makes it possible to attain a high quality of images without the need of performing unnecessarily strong edge enhancement for an image having a significant fraction that is a single-color monotone region(s).

Furthermore, the image processing device, according to third aspect of the present invention, is preferably configured as an image processing device, including: a scene identity level detecting section configured to detect a scene identity level indicating how much a target frame and a frame preceding to the target frame are identical with each other; and a motion level detecting section configured to detect a motion level between the target frame and the frame preceding the target frame, in a case where the scene identity level thus detected by the scene identity level detecting section is higher than a predetermined level, and the motion level thus detected by the motion level detecting section is higher than a predetermined level, the edge enhancement section performing the edge enhancement in such a way that the shoot component to be added is smaller for a frame having a larger first ratio.

Glittering caused when edge enhancement is carried out by adding a large shoot component to an edge at which luminance differences between adjacent pixels are large often becomes noticeable when displaying motion over identical scenes having an edge at which the luminance differences between adjacent pixels are large. With the configuration above, the edge enhancement in which the shoot component to be added is smaller for a frame having a larger first ratio is carried out in a case where (i) the scene identity level is indicating that the degree of identity between the scenes is greater than the predetermined level, and (ii) the motion level is greater than the predetermined level. With this, the edge enhancement with an adjusted shoot component is carried out only for a frame that possibly has noticeable glittering. That is, the process for changing the shoot component can be reduced to minimum necessity.

For example, the scene identity level detecting section (i) prepares a luminance histogram for each frame, the luminance histogram indicating the number of pixels with respect to each of luminances and (ii) detects, as the scene identity level, a total frequency of a histogram indicating differences between a luminance histogram of the target frame and a luminance histogram of the frame preceding the target frame.

For example, the motion level detecting section (i) calculates, for each pixel, a luminance difference between the target frame and the frame preceding the target frame and (ii) detects, as the motion level, a ratio of pixels having a luminance difference greater than or equal to a predetermined motion threshold.

Further, the image processing device, according to fourth aspect of the present invention, is preferably configured as an image processing device, in which the edge enhancement section has a function of performing a LTI process in addition to the edge enhancement, the LTI process causing a gradient of an edge to be steep without adding the shoot component, and performs the LTI process to a frame for which the edge enhancement section has performed the edge enhancement with a smaller shoot component according to the first ratio.

With this configuration, even if the edge enhancement is carried out with a small shoot component, image blurring is prevented by the LTI process.

Further, the image processing device, according to fifth aspect of the present invention, is preferably configured as an image processing device, in which the edge enhancement section performs the LTI process in such a way that the gradient is caused to be steeper for a frame having a greater first ratio.

With this configuration, the LTI process causes the gradient to be steeper as the shoot component in the edge enhancement is smaller, thereby further preventing the blurring in the image.

Furthermore, the image processing device, according to sixth aspect of the present invention, is preferably configured as an image processing device, in which the edge enhancement section performs the edge enhancement by (i) referring to corresponding information in which fractional ranges, which are fractions of a possible range of the first ratio, are associated with edge enhancement filters for edge enhancement, and (ii) using an edge enhancement filter corresponding to a fractional range to which the first ratio thus calculated by the calculating section belongs; and in the corresponding information, the edge enhancement filters are associated with the fractional ranges in such a way that edge enhancement performed with an edge enhancement filter for a fractional range corresponding to a relatively large first ratio provides a shoot component smaller than one provided by edge enhancement performed with an edge enhancement filter for a fractional range corresponding to a relatively small first ratio.

With this configuration, in which edge enhancement filters are provided in advance for respective fractional ranges, it becomes possible to easily perform the edge enhancement with a shoot component adjusted in degree.

Moreover, the image processing device, according to seventh aspect of the present invention, is preferably configured as an image processing device, including: an instruction receiving section configured to receive an instruction on switching ON or OFF a function of the edge enhancement section, the function being a function to change the shoot component according to the first ratio, when the instruction receiving section has turned ON the function of edge enhancement section, the edge enhancement section performing the edge enhancement in such a way that the shoot component to be added is smaller for a frame having a greater first ratio.

This configuration allows a user to easily turn ON and OFF the function of changing the shoot component.

Moreover, the image processing device, according to eighth aspect of the present invention, is preferably configured as an image processing device, including: an image quality mode determining section configured to determine an image quality mode regarding image quality of the image, the calculating section changing the first threshold in value according to the image quality mode determined by the image quality mode determining section.

With this configuration, the value of the first threshold is changed according to the image quality mode, so that the value of the first ratio is changed according to the image quality mode. Thus, the strength of the edge enhancement can be changed according to the image quality mode.

Furthermore, an image processing device according to ninth aspect of the present invention is an image processing device, including: a detecting section configured to detect a feature of an image represented by image data; a judging section configured to judge, based on the feature, whether or not the image contains text; and a text enhancement section configured to perform, in a case where it is judged that the image contains text, a process for heightening visibility of the text in the image, the detecting section detecting a first difference for each of a plurality of pixels in the image, the first difference being a difference in luminance between frames, and based on a frequency distribution of the first differences, the judging section performing the judgment as to whether or not the image contains text.

With this image processing device, the process for heightening the visibility of text (referred to as "text enhancement" in this Specification) is carried out when an image contains text. Thus, only required is to judge whether or not "image contains text", and it is not necessary to identify text contained in the image. This can reduce time necessary for the entire image processing.

Especially, the image processing device is configured such that the judgment as to whether to perform the text enhancement is carried out based on the frequency distribution of the first differences, each of which is the difference in luminance in a pixel between frames. The detection of the frequency distribution and the judging process as to whether to perform the text enhancement can be realized with relatively simple logic. This can reduce time necessary for the entire image processing.

Preferably, the image processing device, according to tenth aspect of the present invention is configured as an image processing device in which, in a case where the frequency distribution of the first differences is such that a frequency of pixels, whose first difference is greater than or equal to a third threshold, is less than or equal to a fourth threshold, the judging section judges that the image contains text.

With this configuration, it becomes possible to easily and surely determine whether an image contains text.

Furthermore, the image processing device, according to eleventh aspect, is preferably configured as an image processing device, in which the detecting section further detects a luminance of each of the plurality of pixels in the image; and further based on a frequency distribution of the luminances, the judging section performs the judgment as to whether or not the image contains text.

With this configuration, it becomes possible to easily and surely determine whether an image contains text.

Furthermore, the image processing device, according to twelfth aspect of the present invention, is preferably configured as an image processing device, in which, in a case where (i) the frequency distribution of the luminances includes two or more luminances whose frequencies are greater than or equal to a fifth threshold and (ii) frequencies of luminances, which are adjacent to each of the two or more luminances, are less than or equal to a sixth threshold that is lower than the fifth threshold, the judging section judges that the image contains text.

With this configuration, it becomes possible to easily and surely determine whether an image contains text.

Furthermore, the image processing device, according to thirteenth aspect of the present invention, is preferably configured as an image processing device, in which the detecting section further detects, for each of the plurality of pixels in the image, a second difference, which is a difference in luminance between the pixel and another pixel adjacent to the pixel; and further based on a frequency distribution of the second differences, the judging section performs the judgment as to whether or not the image contains text.

With this configuration, it becomes possible to easily and surely determine whether an image contains text.

Moreover, the image processing device, according to fourteenth aspect of the present invention, is preferably configured as an image processing device, in which, in a case where the frequency distribution of the second differences is such that a frequency of pixels, whose second difference is greater than or equal to a seventh threshold, is less than or equal to an eighth threshold, the judging section judges that the image contains text.

With this configuration, it becomes possible to easily and surely determine whether an image contains text.

Furthermore, the image processing device, according to fifteenth aspect of the present invention, is preferably configured as an image processing device, in which the text enhancement section weakens enhancement in the image in order to heighten visibility of the text contained in the image.

With this configuration, it is possible to remove the shoot component at an edge portion of text, thereby heightening visibility of the text.

Moreover, the image processing device, according to sixteenth aspect of the present invention, is preferably configured as an image processing device, in which the text enhancement section intensifies LTI in the image in order to heighten visibility of the text contained in the image.

With this configuration, it is possible to enhance an edge portion of text, thereby heightening visibility of the text.

Moreover, the image processing device, according to seventeenth aspect of the present invention, is preferably configured as an image processing device, in which the text enhancement section controls CTI in the image in order to heighten visibility of the text contained in the image.

With this configuration, it is possible to enhance an edge portion of text, thereby heightening visibility of the text.

The scope of the present invention also encompasses a television receiver including any one of the image processing devices.

Eighteen aspect of the present invention is an image processing method for performing edge enhancement by adding a shoot component in a frame constituting an image, the method including the steps of: calculating, for each of pixels constituting the frame, a luminance difference between a pixel and another pixel adjacent to the pixel, and calculating a first ratio which is a ratio of pixels whose luminance difference is greater than or equal to a first threshold; and performing the edge enhancement in such a way that the shoot component to be added is smaller for a frame having a larger first ratio.

Nineteen aspect of the present invention is an image processing method, including the steps of: (a) detecting a feature of an image represented by image data; (b) judging, based on the feature, whether or not the image contains text; and (c) performing, in a case where it is judged that the image contains text, a process for heightening visibility of text in the image, in the step (a), a first difference being detected for each of a plurality of pixels in the image, the first difference being a difference in luminance between frames, and in the step (b), whether or not the image contains text being judged based on a frequency distribution of the first differences.

With the image processing methods as arranged above, an effect similar to that of the image processing devices can be attained.

Moreover, the scope of the present invention also encompasses a program for operating a computer as each of the sections of any of the image processing devices, and a computer-readable recording medium in which the program is recorded.

The present invention is not limited to the embodiments, but can be altered by a skilled person in the art within the scope of the claims. An embodiment derived from a proper combination of technical means disclosed in respective different embodiments is also encompassed in the technical scope of the present invention.

INDUSTRIAL APPLICABILITY

The present invention is suitably applicable to image processing devices for improving quality of an image.

REFERENCE SIGNS LIST

1 Television Receiver
100, 101, 102 Image Processing Device
110 Image Obtaining Section
120 Decoding Process Section
130, 131 Edge Histogram Creating Section (Calculating Section)
140, 141, 142 Edge Enhancement Section
151 Scene Identity Level Detecting Section
161 Motion Level Detecting Section
172 Instruction Receiving Section
173 Image Quality Mode Determining Section
200 Image Processing Device
202 Obtaining Section
204 Decoding Section
206 Judging Section
210 Detecting Section
212 Edge Histogram Detecting Section
214 Inter-frame difference histogram Detecting Section
216 Luminance Histogram Detecting Section
220 Text Enhancement Section (Edge Enhancement Section)
222 Enhancement Control Section
224 LTI Control Section
226 CTI Control Section

The invention claimed is:

1. An image processing device including an edge enhancement section configured to perform edge enhancement by adding a shoot component in a frame constituting an image, the image processing device comprising:
a calculating section configured to calculate, for each of pixels constituting the frame, a luminance difference between a pixel and another pixel adjacent to the pixel, and to calculate a first ratio which is a ratio of pixels whose luminance difference is greater than or equal to a first threshold,
the edge enhancement section performing the edge enhancement in such a way that the magnitude of the shoot component to be added is inversely proportional to the magnitude of the first ratio, wherein:
the calculating section further calculates a second ratio and a third ratio, the second ratio being a ratio of pixels whose luminance difference is (i) greater than or equal to a second threshold which is smaller than the first threshold and (ii) less than the first threshold, and the third ratio being a ratio of pixels whose luminance difference is less than the second threshold; and
the edge enhancement section performs the edge enhancement in such a way that a shoot component, which is to be added for a frame whose second ratio is smaller than the third ratio, is smaller than a shoot component which is to be added for a frame whose second ratio is greater than the third ratio.

2. The image processing device as set forth in claim 1, comprising:
a scene identity level detecting section configured to detect a scene identity level indicating how much a target frame and a frame preceding to the target frame are identical with each other; and
a motion level detecting section configured to detect a motion level between the target frame and the frame preceding the target frame,
in a case where the scene identity level thus detected by the scene identity level detecting section is higher than a predetermined level, and the motion level thus detected by the motion level detecting section is higher than a predetermined level, the edge enhancement section performing the edge enhancement in such a way that the magnitude of the shoot component to be added is inversely proportional to the magnitude of the first ratio.

3. The image processing device as set forth in claim 1, wherein the edge enhancement section has a function of performing a LTI process in addition to the edge enhancement, the LTI process causing a gradient of an edge to be steep without adding the shoot component, and performs the LTI process to a frame for which the edge enhancement section has performed the edge enhancement with a smaller shoot component magnitude that is inversely proportional to the magnitude of the first ratio.

4. The image processing device as set forth in claim 3, wherein the edge enhancement section performs the LTI process in such a way that the magnitude of the gradient is caused to be inversely proportional to the magnitude of first ratio.

5. The image processing device as set forth in claim 1, wherein:
the edge enhancement section performs the edge enhancement by (i) referring to corresponding information in which fractional ranges, which are fractions of a possible range of the first ratio, are associated with edge enhancement filters for edge enhancement, and (ii) using an edge enhancement filter corresponding to a fractional range to which the first ratio thus calculated by the calculating section belongs; and
in the corresponding information, the edge enhancement filters are associated with the fractional ranges in such a way that the magnitude of the shoot component added in an edge enhancement filter for a respective fractional range is inversely proportional to the magnitude of the first ratio.

6. The image processing device as set forth in claim 1, comprising:
an instruction receiving section configured to receive an instruction on switching ON or OFF a function of the edge enhancement section, the function being a function to change the shoot component according to the first ratio,
when the instruction receiving section has turned ON the function of edge enhancement section, the edge enhancement section performing the edge enhancement in such a way that the magnitude of the shoot component to be added is inversely proportional to the magnitude of the first ratio.

7. An image processing device including an edge enhancement section configured to perform edge enhancement by adding a shoot component in a frame constituting an image, the image processing device comprising:
a calculating section configured to calculate, for each of pixels constituting the frame, a luminance difference between a pixel and another pixel adjacent to the pixel, and to calculate a first ratio which is a ratio of pixels whose luminance difference is greater than or equal to a first threshold,
the edge enhancement section performing the edge enhancement in such a way that the magnitude of the shoot component to be added is inversely proportional to the magnitude of the first ratio;
a scene identity level detecting section configured to detect a scene identity level indicating how much a target frame and a frame preceding to the target frame are identical with each other; and
a motion level detecting section configured to detect a motion level between the target frame and the frame preceding the target frame,
in a case where the scene identity level thus detected by the scene identity level detecting section is higher than a predetermined level, and the motion level thus detected by the motion level detecting section is higher than a predetermined level, the edge enhancement section performing the edge enhancement in such a way that the magnitude of the shoot component to be added is inversely proportional to the magnitude of the first ratio,
wherein the scene identity level detecting section (i) prepares a luminance histogram for each frame, the luminance histogram indicating the number of pixels with respect to each of luminances and (ii) detects, as the scene identity level, a total frequency of a histogram indicating differences between a luminance histogram of the target frame and a luminance histogram of the frame preceding the target frame.

8. An image processing device including an edge enhancement section configured to perform edge enhancement by adding a shoot component in a frame constituting an image, the image processing device comprising:
a calculating section configured to calculate, for each of pixels constituting the frame, a luminance difference between a pixel and another pixel adjacent to the pixel, and to calculate a first ratio which is a ratio of pixels whose luminance difference is greater than or equal to a first threshold,
the edge enhancement section performing the edge enhancement in such a way that the magnitude of the shoot component to be added is inversely proportional to the magnitude of the first ratio;
a scene identity level detecting section configured to detect a scene identity level indicating how much a target frame and a frame preceding to the target frame are identical with each other; and
a motion level detecting section configured to detect a motion level between the target frame and the frame preceding the target frame,
in a case where the scene identity level thus detected by the scene identity level detecting section is higher than a predetermined level, and the motion level thus detected by the motion level detecting section is higher than a predetermined level, the edge enhancement section performing the edge enhancement in such a way that the magnitude of the shoot component to be added is inversely proportional to the magnitude of the first ratio, wherein the motion level detecting section (i) calculates, for each pixel, a luminance difference between the target frame and the frame preceding the target frame and (ii) detects, as the motion level, a ratio of pixels having a luminance difference greater than or equal to a predetermined motion threshold.

9. The image processing device as set forth in claim 1, comprising:

an image quality mode determining section configured to determine an image quality mode regarding image quality of the image, the calculating section changing the first threshold in value according to the image quality mode determined by the image quality mode determining section.

10. An image processing method for performing edge enhancement by adding a shoot component in a frame constituting an image, the method comprising the steps of:

calculating, for each of pixels constituting the frame, a luminance difference between a pixel and another pixel adjacent to the pixel, and calculating a first ratio which is a ratio of pixels whose luminance difference is greater than or equal to a first threshold; and performing the edge enhancement in such a way that the magnitude of the shoot component to be added is inversely proportional to the magnitude of the first ratio, wherein:

the step of calculating further includes calculating a second ratio and a third ratio, the second ratio being a ratio of pixels whose luminance difference is (i) greater than or equal to a second threshold which is smaller than the first threshold and (ii) less than the first threshold, and the third ratio being a ratio of pixels whose luminance difference is less than the second threshold; and the edge enhancement is performed in such a way that a shoot component, which is to be added for a frame whose second ratio is smaller than the third ratio, is smaller than a shoot component which is to be added for a frame whose second ratio is greater than the third ratio.

11. An image processing method for performing edge enhancement by adding a shoot component in a frame constituting an image, the method comprising the steps of:

calculating, for each of pixels constituting the frame, a luminance difference between a pixel and another pixel adjacent to the pixel, and calculating a first ratio which is a ratio of pixels whose luminance difference is greater than or equal to a first threshold;

performing the edge enhancement in such a way that the magnitude of the shoot component to be added is inversely proportional to the magnitude of the first ratio;

detecting a scene identity level indicating how much a target frame and a frame preceding to the target frame are identical with each other; and detecting a motion level between the target frame and the frame preceding the target frame, in a case where the scene identity level thus detected by the step of detecting scene identity level is higher than a predetermined level, and the motion level thus detected by the step of detecting motion level is higher than a predetermined level, performing the edge enhancement in such a way that the magnitude of the shoot component to be added is inversely proportional to the magnitude of the first ratio, wherein the step of detecting scene identity level includes (i) preparing a luminance histogram for each frame, the luminance histogram indicating the number of pixels with respect to each of luminances and (ii) detecting, as the scene identity level, a total frequency of a histogram indicating differences between a luminance histogram of the target frame and a luminance histogram of the frame preceding the target frame.

12. An image processing method for performing edge enhancement by adding a shoot component in a frame constituting an image, the method comprising the steps of:

calculating, for each of pixels constituting the frame, a luminance difference between a pixel and another pixel adjacent to the pixel, and calculating a first ratio which is a ratio of pixels whose luminance difference is greater than or equal to a first threshold;

performing the edge enhancement in such a way that the magnitude of the shoot component to be added is inversely proportional to the magnitude of the first ratio;

detecting a scene identity level indicating how much a target frame and a frame preceding to the target frame are identical with each other; and detecting a motion level between the target frame and the frame preceding the target frame, in a case where the scene identity level thus detected by the step of detecting scene identity level is higher than a predetermined level, and the motion level thus detected by the step of detecting motion level is higher than a predetermined level, performing the edge enhancement in such a way that the magnitude of the shoot component to be added is inversely proportional to the magnitude of the first ratio, wherein the step of detecting motion level includes (i) calculating, for each pixel, a luminance difference between the target frame and the frame preceding the target frame and (ii) detecting, as the motion level, a ratio of pixels having a luminance difference greater than or equal to a predetermined motion threshold.

* * * * *